United States Patent
Copp et al.

(10) Patent No.: US 10,322,794 B1
(45) Date of Patent: Jun. 18, 2019

(54) SYSTEM AND METHOD FOR INDEPENDENT RETENTION AND RELEASE OF INDIVIDUALLY STOWED FLIGHT CONTROL SURFACES

(71) Applicant: LOCKHEED MARTIN CORPORATION, Bethesda, MD (US)

(72) Inventors: James C. Copp, Arlington, TX (US); Steven J. Ellzey, Grand Prairie, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 356 days.

(21) Appl. No.: 15/389,066

(22) Filed: Dec. 22, 2016

Related U.S. Application Data

(63) Continuation-in-part of application No. 15/014,399, filed on Feb. 3, 2016, now Pat. No. 10,124,880.

(51) Int. Cl.
| | |
|---|---|
| *B64C 5/12* | (2006.01) |
| *B64C 39/02* | (2006.01) |
| *B64C 3/56* | (2006.01) |
| *B64C 5/02* | (2006.01) |

(52) U.S. Cl.
CPC .............. *B64C 5/12* (2013.01); *B64C 3/56* (2013.01); *B64C 5/02* (2013.01); *B64C 39/024* (2013.01); *B64C 2201/021* (2013.01); *B64C 2201/102* (2013.01); *B64C 2201/20* (2013.01)

(58) Field of Classification Search
CPC .. B64C 5/12; B64C 3/56; B64C 3/546; B64C 2201/102; B64C 11/28; B64C 9/36; B64C 3/385
See application file for complete search history.

(56) References Cited

U.S. PATENT DOCUMENTS

| | | | | |
|---|---|---|---|---|
| 2,417,267 A | * | 3/1947 | Porter | A63H 27/007 446/62 |
| 3,826,448 A | * | 7/1974 | Burk, Jr. | B64C 5/12 244/3.27 |
| 4,659,038 A | * | 4/1987 | Hoeppner | B64C 3/56 244/3.27 |

(Continued)

OTHER PUBLICATIONS

Author Unknown, "Suicide Bdyat: Development Trends Loitering Munitions. Part 2," topwar.ru, xn----ctbjbare5aadbdikvl8n.xn--p1ai/tehnika-i-vooruzhenie/184538-samoubijci-bdyat-napravleniya-razvitiya-barrazhiruyushih-boepripasov-chast-2_93368.html, 2012, military pensioners, pp. 1-11.

*Primary Examiner* — Magdalena Topolski
(74) *Attorney, Agent, or Firm* — Terry M. Sanks, Esq.; Beusse Wolter Sanks & Maire, PLLC

(57) ABSTRACT

An aircraft is provided comprising: a fuselage, a first tail fin rotatably mounted to a first lateral side and a second tail fin rotatably mounted to the second lateral side. A wing body is rotatably mounted to the underside of the fuselage. A pair of independent tail fin latch and release devices are provided to independently latch the first tail fin and the second tail fin when the wing body having a first angle is in a stowed position with respect to the fuselage, to independently unlatch the first tail fin in response to a second angle of the wing body with respect to the fuselage, and to independently unlatch the second tail fin in response to a third angle of the wing body with respect to the fuselage. The first angle, second angle and third angle are different angles with respect to the longitudinal axis of the fuselage.

17 Claims, 25 Drawing Sheets

(56) References Cited

U.S. PATENT DOCUMENTS

| | | | | |
|---|---|---|---|---|
| 4,842,218 | A * | 6/1989 | Groutage | B64C 39/024 244/137.4 |
| 5,671,899 | A * | 9/1997 | Nicholas | B64C 3/40 244/3.28 |
| 6,446,906 | B1 * | 9/2002 | Voigt | B64C 9/36 244/3.27 |
| 7,584,925 | B2 * | 9/2009 | Miller | B64C 39/024 244/3.28 |
| 8,089,034 | B2 * | 1/2012 | Hammerquist | B64C 3/56 244/3.27 |
| 8,492,692 | B2 * | 7/2013 | Fisher | B64C 39/024 244/13 |
| 8,985,504 | B2 * | 3/2015 | Tao | B64C 3/44 244/49 |
| 9,616,997 | B2 * | 4/2017 | Parks | B60F 5/02 |
| 2005/0242236 | A1 * | 11/2005 | Purcell, Jr. | B64C 3/56 244/87 |
| 2007/0018033 | A1 * | 1/2007 | Fanucci | F42B 10/143 244/3.27 |
| 2012/0280080 | A1 | 11/2012 | Lubenow et al. | |
| 2013/0146716 | A1 * | 6/2013 | Gettinger | B64C 39/024 244/215 |
| 2016/0176520 | A1 * | 6/2016 | Goldstein | B64C 39/024 244/17.17 |
| 2017/0197702 | A1 * | 7/2017 | Alley | B64C 11/28 |
| 2018/0111675 | A1 * | 4/2018 | Buttolph | B64C 3/56 |

\* cited by examiner

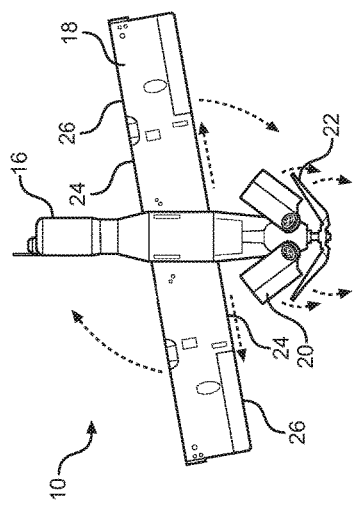
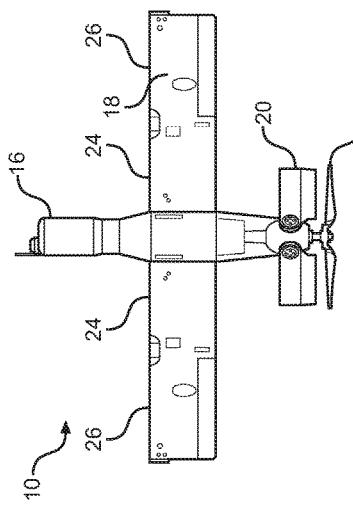
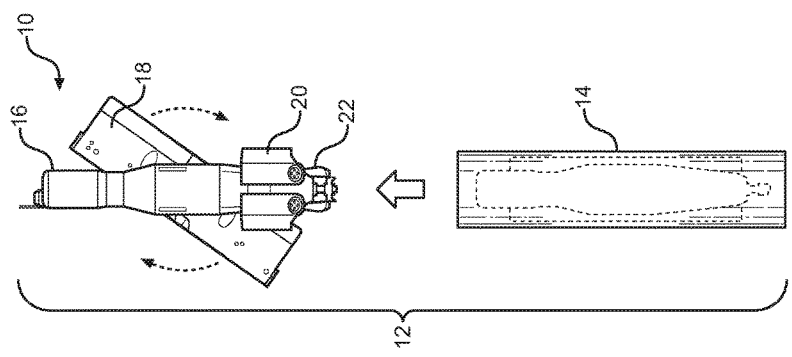

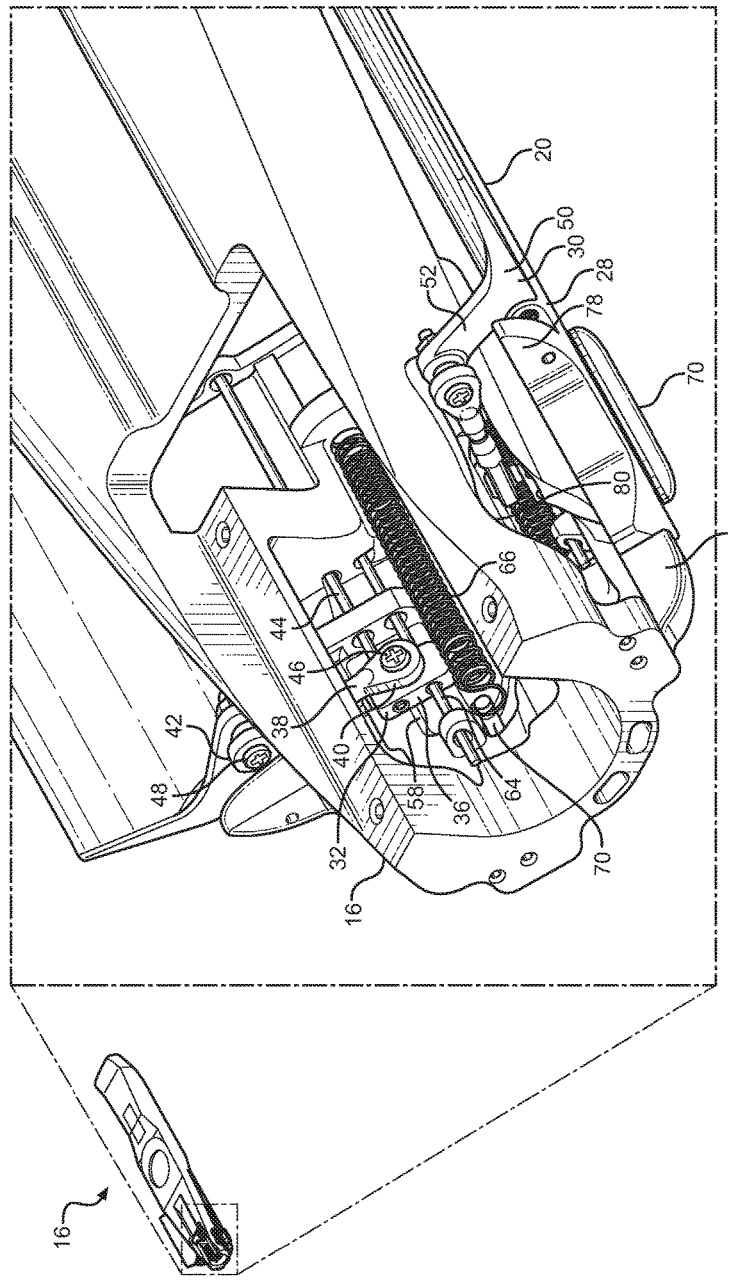

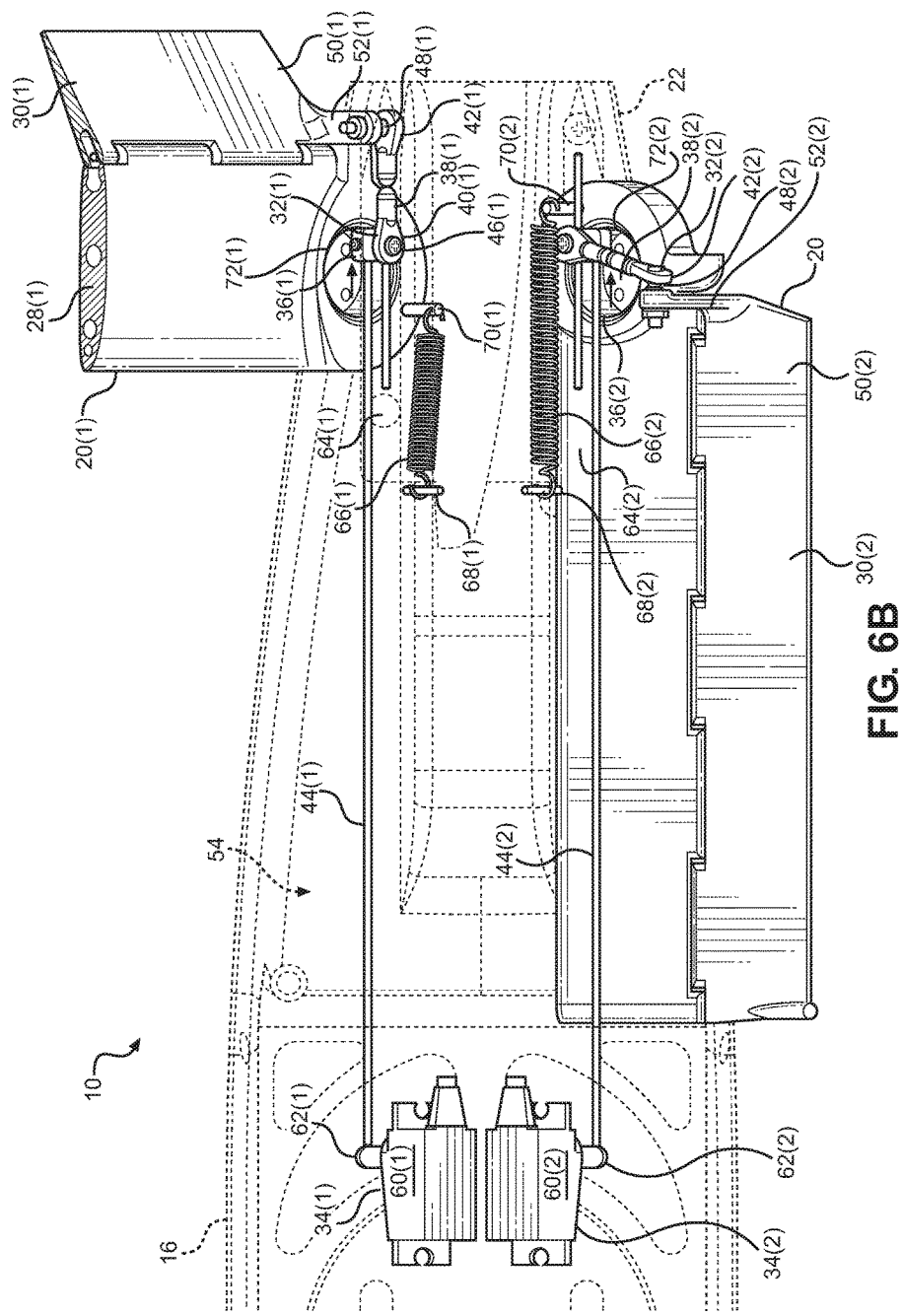

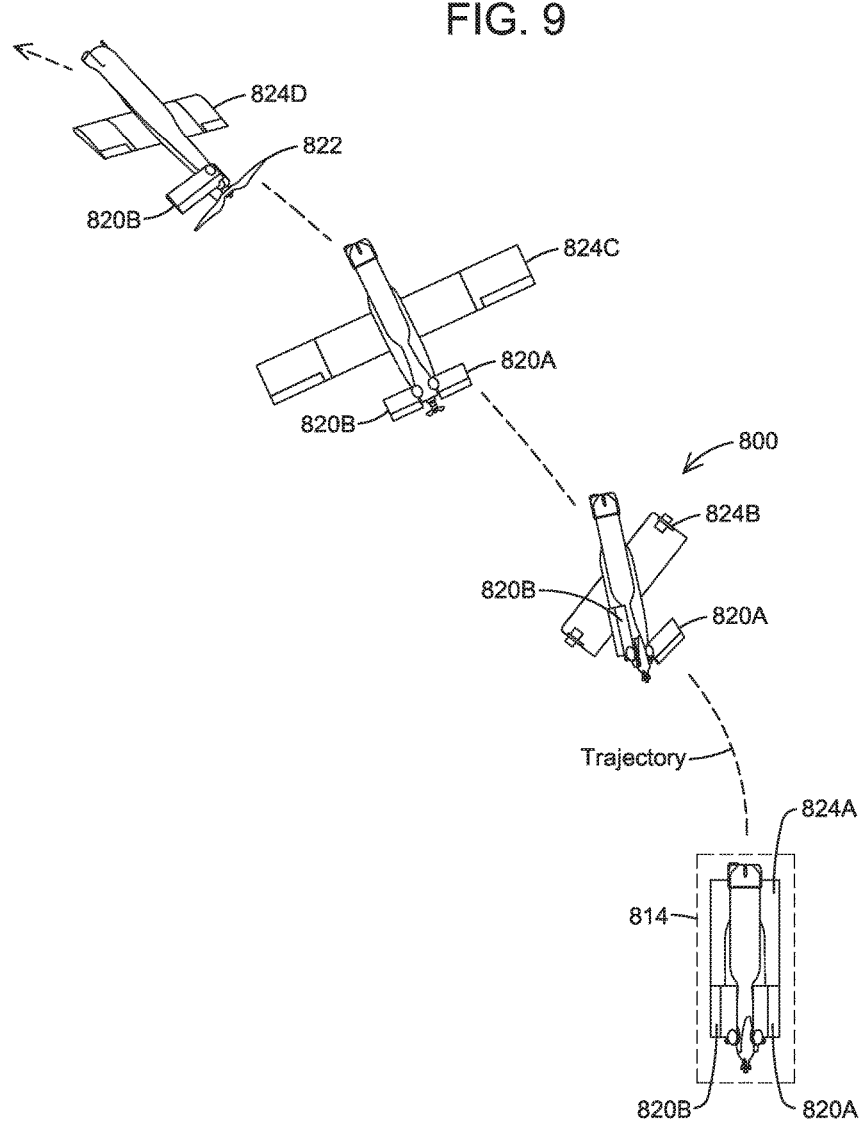

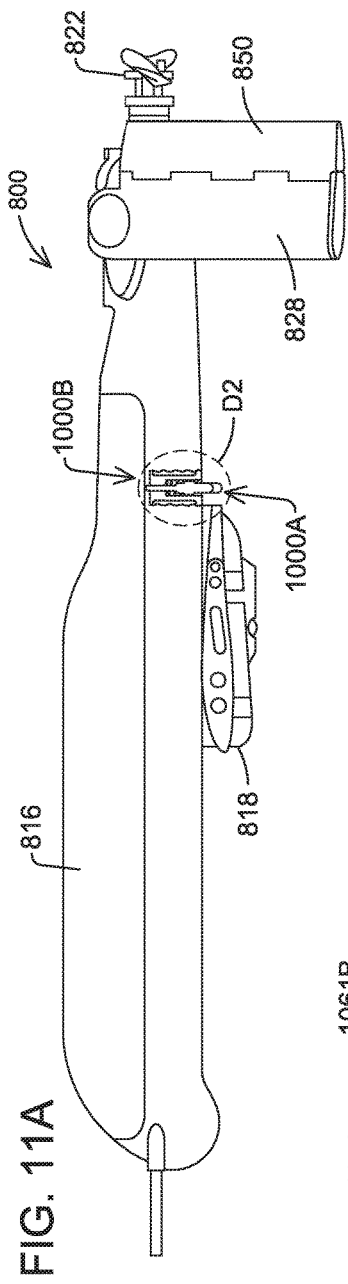
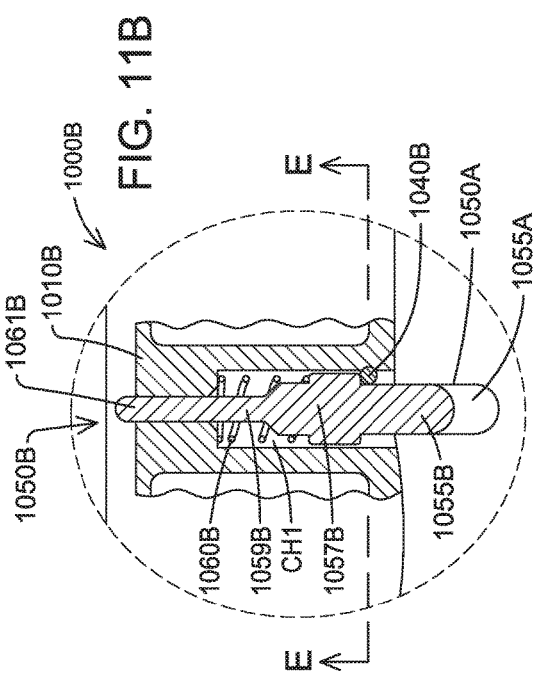
FIG. 11A
FIG. 11B

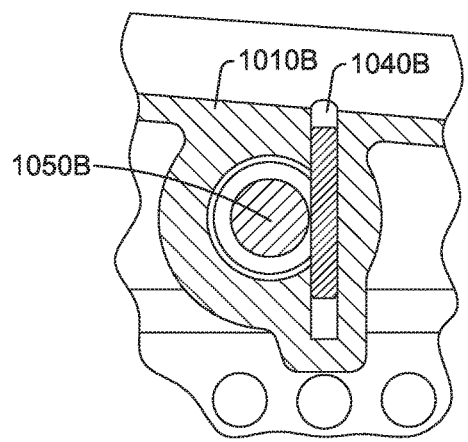
FIG. 12A
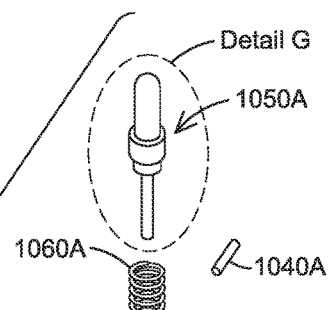
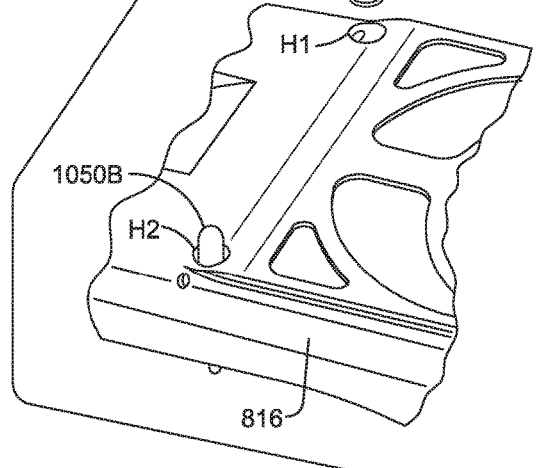
FIG. 12B
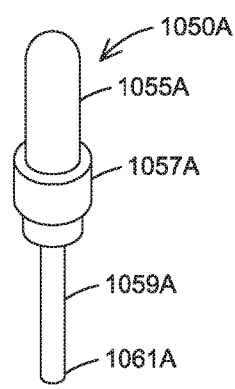
FIG. 12C

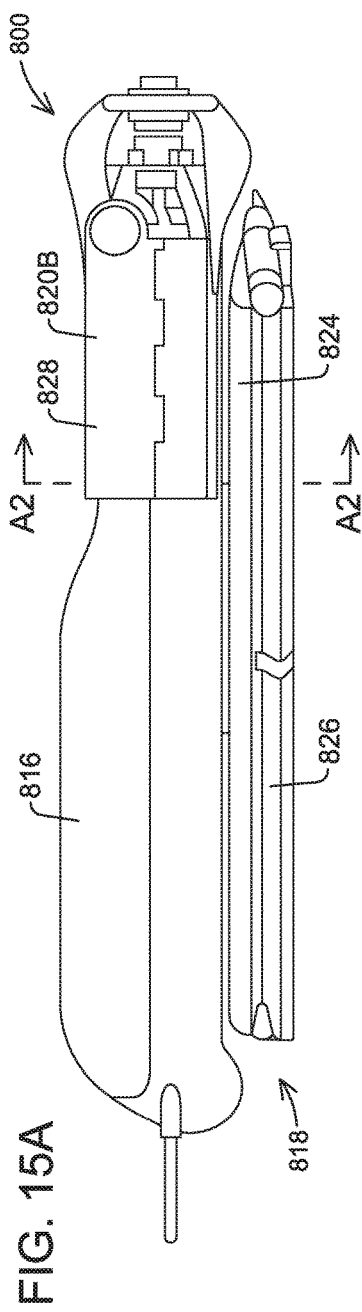
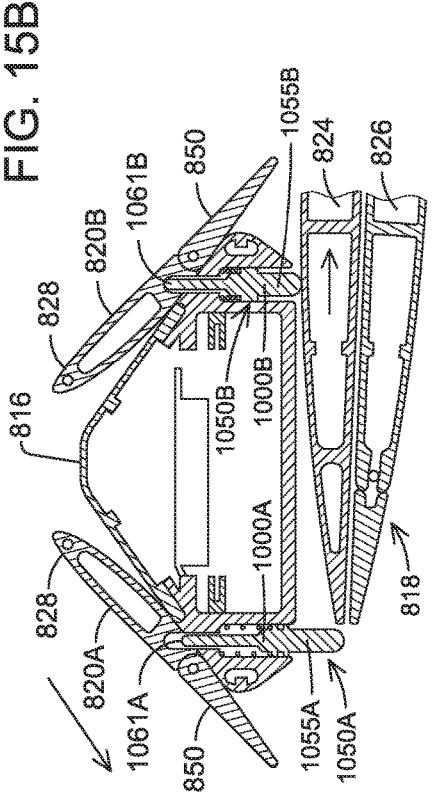

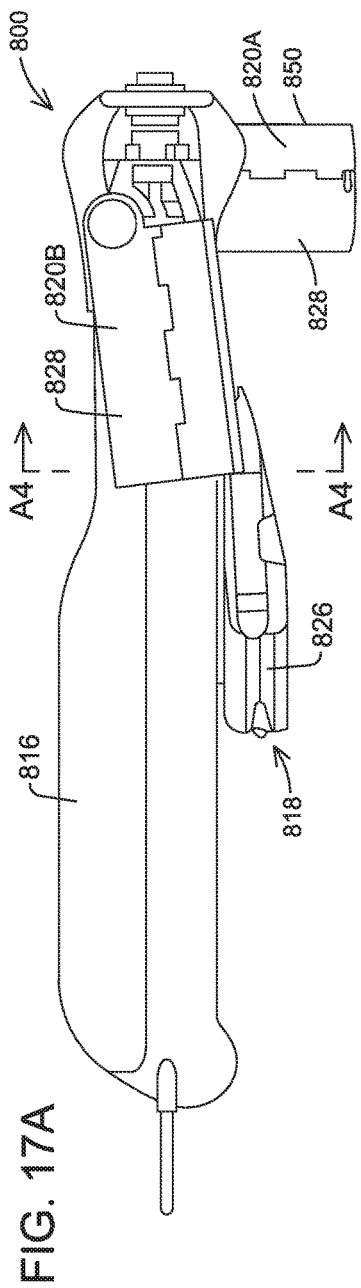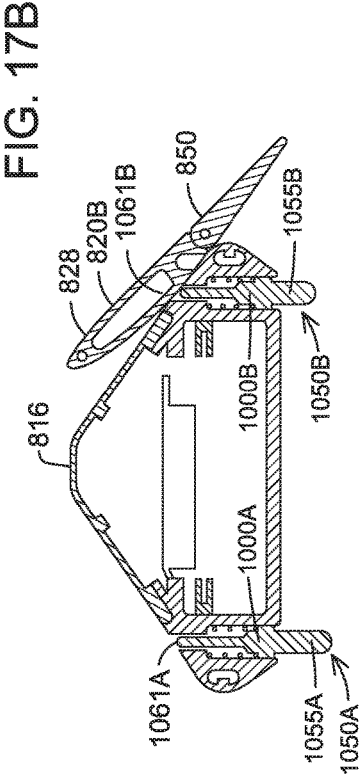

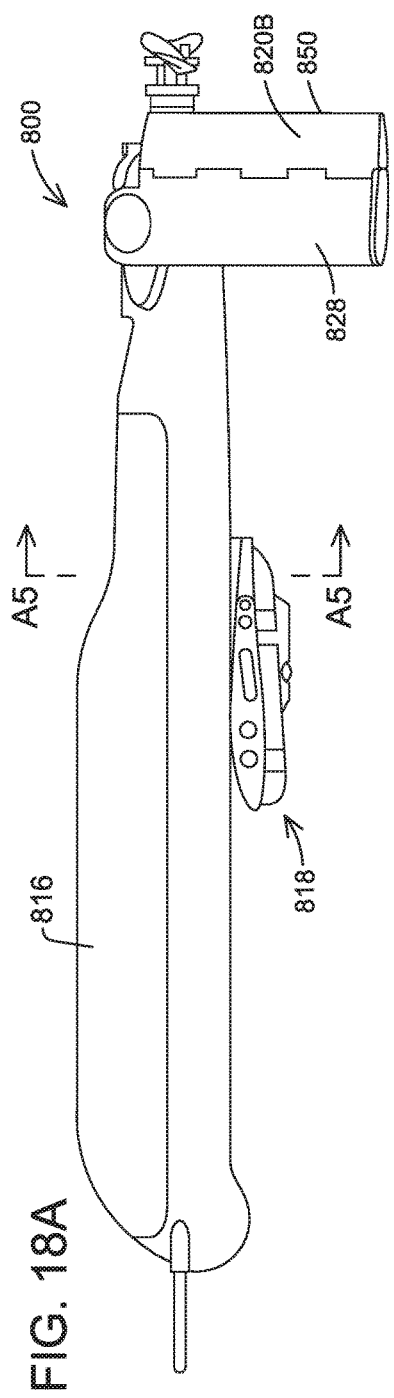
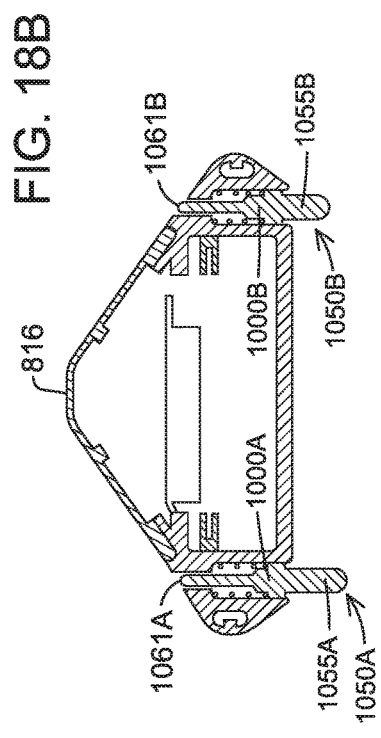

SYSTEM AND METHOD FOR INDEPENDENT RETENTION AND RELEASE OF INDIVIDUALLY STOWED FLIGHT CONTROL SURFACES

CROSS-REFERENCE TO RELATED APPLICATIONS

This application is a continuation-in-part of U.S. patent application Ser. No. 15/014,399, filed Feb. 3, 2016, titled "ROTATABLE CONTROL SURFACE ASSEMBLY FOR AN UNMANNED AERIAL VEHICLE," assigned to Lockheed Martin Corporation, incorporated herein by reference as if set forth in full below.

TECHNICAL FIELD

The field of the disclosure relates to an aircraft, such as an unmanned aerial vehicle (UAV), and in particular to a control surface assembly that allows a control surface member to rotate with respect to a fuselage of the UAV.

BACKGROUND

Unmanned aerial vehicles (UAVs) are aircraft that are capable of flight without an onboard pilot. UAVs may be capable of autonomous flight, and may also be capable of being controlled by a remotely located human pilot. As a result, UAVs can be made smaller and more portable than manned aircraft. However, many UAVs require a plurality of fins with control surfaces, such as wings, rudders, and/or tailfins, to operate properly, which complicates storage and portability of the UAV. Accordingly, there is a need for a UAV with fins that can be quickly and reliably converted back and forth between a stowed configuration and a deployed configuration without interfering with the operation of the UAV.

SUMMARY

According to an aspect of the embodiments, a system is provided which comprises a pair of independent tail fin latch and release devices to independently latch a first tail fin and a second tail fin when a wing body is stowed at a first angle along an underside of a fuselage of a flight vehicle. Each tail fin latch and release device comprises a release pin column configured to be mounted in a shoulder of the fuselage, the release pin column including an elongated channel having opposite end open through the fuselage. A spring biased release pin being spring biased in the elongated channel, the spring biased release pin comprising a collar, a first end configured to latch to a respective one tail fin in a latched state and a second end configured to ride along a top wing surface of the wing body during deployment of the wing body, the first end and second end being separated by the collar. A spring positioned with the column and spiraled around the first end to bias the spring biased release pin in an unlatched state such that as the wing body clears the second end, the spring pushes the spring biased release pin through the underside of the fuselage to unlatch the respective one tail fin.

Another aspect of the embodiments includes an aircraft comprising a fuselage having a first lateral side, a second lateral side, a top surface, an underside and a longitudinal axis. A first tail fin rotatably mounted to the first lateral side. A second tail fin rotatably mounted to the second lateral side. A wing body rotatably mounted to the underside of the fuselage. The wing body comprising a top wing surface. A pair of independent tail fin latch and release devices independently latch the first tail fin and the second tail fin when the wing body having a first angle is in a stowed position with respect to the fuselage, to independently unlatch the first tail fin in response to a second angle of the wing body with respect to the fuselage, and to independently unlatch the second tail fin in response to a third angle of the wing body with respect to the fuselage. The first angle, second angle and third angle are different angles with respect to the longitudinal axis of the fuselage.

A further aspect of the embodiments includes a method comprising: independently latching, by a first independent tail fin latch and release device, a first tail fin coupled to a fuselage of an aircraft when a wing body has a first angle in a stowed position with respect to an underside of the fuselage; independently latching, by a second independent tail fin latch and release device, a second tail fin to the fuselage of the aircraft when the wing body has the first angle in the stowed position with respect to the underside of the fuselage; independently unlatching, by a first independent tail fin latch and release device, the first tail fin in response to a second angle of the wing body with respect to the underside of the fuselage; and independently unlatching, by a second independent tail fin latch and release device, the second tail fin in response to a third angle of the wing body with respect to the underside of the fuselage, the first angle, second angle and third angle are different angles with respect to a longitudinal axis of the fuselage.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A-1C illustrate an unmanned aerial vehicle (UAV) according to an embodiment being launched from a storage and launch tube, with the UAV converting from a stowed configuration to a deployed configuration during launch;

FIG. 4 illustrates a detail view of a portion of an inverted perspective view of the UAV according to the embodiment of FIGS. 1A-3C in the stowed configuration;

FIGS. 6A and 6B illustrate bottom cutaway views of the UAV of FIGS. 1A-5, with a left fin in the deployed configuration and a right fin in the stowed configuration;

FIG. 9 illustrates a trajectory of a deploying UAV from the stowed position to a fully deployed position;

FIG. 11A illustrates a side view of the deployed UAV;

FIG. 11B illustrates a detail view of a respective one release pin assembly;

FIG. 12A illustrates a cross sectional view along the plane E-E of FIG. 11B;

FIG. 12B illustrates an exploded view of one spring-loaded release pin;

FIG. 12C illustrates a release pin member;

FIG. 15A illustrates a side view of the UAV with the wing sub-assembly partially unfolded and the right hand tail fin sub-assembly on a verge of release from the stowed state;

FIG. 15B illustrates a cross sectional view along section A2-A2 of FIG. 15A;

FIG. 16A illustrates a side view of the UAV with the wing sub-assembly partially unfolded and the left-hand tail fin sub-assembly on the very of release from the stowed state;

FIG. 16B illustrates a cross sectional view along section A3-A3 of FIG. 16A;

FIG. 17A illustrates a side view of the UAV with the wing sub-assembly unfolded and the left-hand tail fin sub-assembly clear of obstruction of the wing body;

FIG. 17B illustrates a cross sectional view along section A4-A4 of FIG. 17A;

FIG. 18A illustrates a side view of the UAV with the wing sub-assembly unfolded and deployed and the pair of tail fin sub-assemblies in the deployed state;

FIG. 18B illustrates a cross sectional view along section A5-A5 of FIG. 18A;

DETAILED DESCRIPTION

Figure 2A:
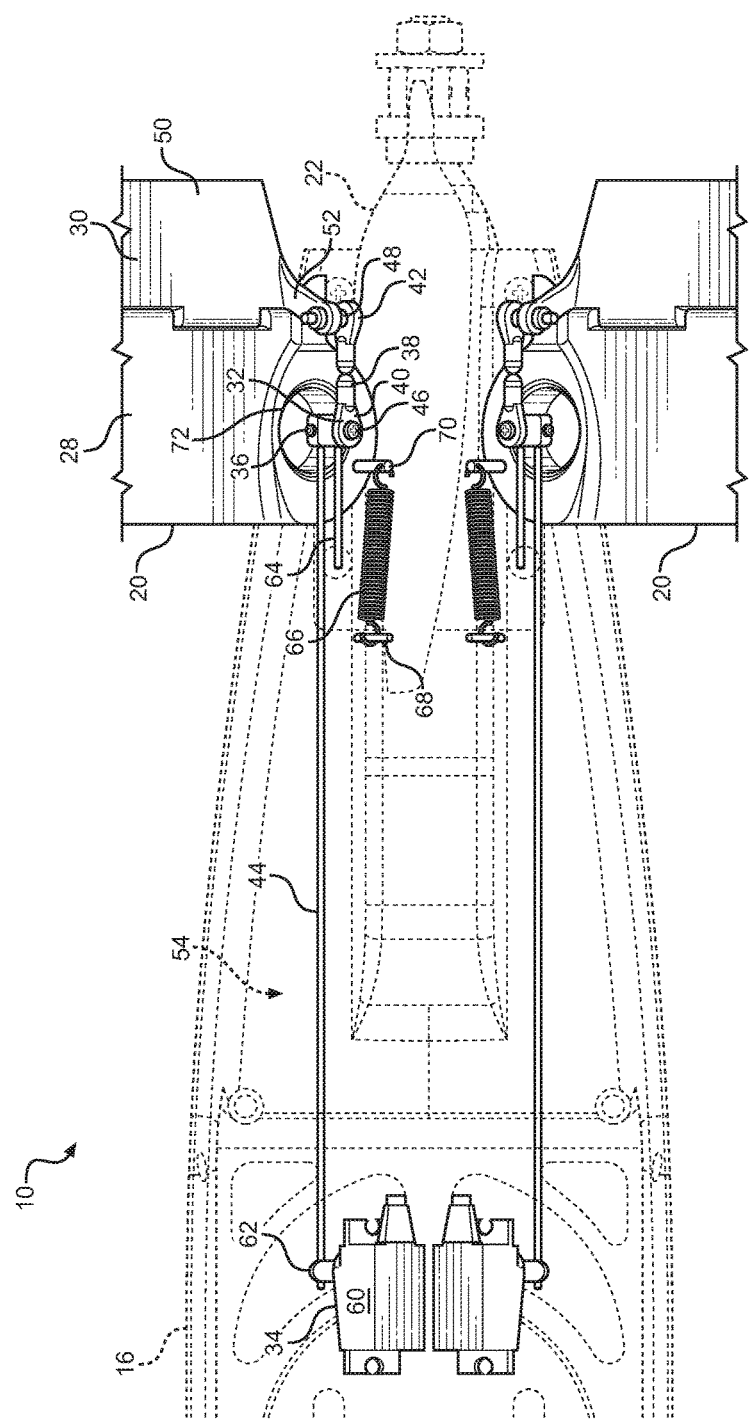
FIGS. 2A-2C illustrate internal components of the UAV of FIGS. 1A-1C in the deployed configuration, to illustrate operation of tail fin sub-assemblies of the UAV when deployed.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein. The term "substantially" used herein in conjunction with a numeric value means any value that is within a range of five percent greater than or five percent less than the numeric value. The term "substantially" used herein in conjunction with an angular definition means any value that is within a range of five degrees greater than or five degrees less than the angular relationship.

Embodiments include a control surface assembly for an unmanned aerial vehicle (UAV). The control surface assembly comprises a fin configured to be rotatably coupled to a fuselage of the UAV, with a control surface member rotatably coupled to the fin. A control surface linkage is configured to be coupled between the control surface member and an actuator disposed in the fuselage. The fin is rotatable with respect to the fuselage between a stowed configuration, in which the UAV is prepared for storage, and a deployed configuration, in which the UAV is capable of flight. In the deployed configuration, the control surface linkage is configured to rotate the control surface member with respect to the fin when the actuator actuates the control surface linkage. In the stowed configuration, however, the control surface linkage is configured to move with respect to the fin without rotating the control surface member, when the actuator actuates the control surface linkage.

One advantage of disposing the actuator in the fuselage is that actuators may contain relatively heavy components, such as a motor, for example, that can interfere with the desired weight distribution of the UAV. For example, disposing the actuator on or in the rotatable fin itself can interfere with the aerodynamic characteristics, and can also make the UAV "tail-heavy" when disposed on or in a rearwardly disposed fin, such as a tailfin or rudder. For many UAV designs, it is more desirable to locate the heavier actuator components inside the fuselage in a forward location for optimal weight distribution.

This arrangement requires a mechanical linkage between the actuator and the control surface, but this presents difficulties when the fin is movable with respect to the fuselage. The mechanical linkage must be capable of moving the control surface when the fin is deployed, and the linkage must also be arranged so that actuating the linkage when the fin is deployed does not damage or stress the linkage or fin when the fin is stowed. One advantage of embodiments described herein is that a control surface linkage can operate the control surface in the deployed configuration and can also be actuated in the stowed configuration without damaging or stressing the control surface linkage or fin.

Before discussing the details of an example control surface linkage, a UAV 10 having a deployed and stowed configuration according to an embodiment is described in relation to FIGS. 1A-1C. The UAV 10 is part of a portable launch system 12 that also comprises a storage and launch tube 14. In this embodiment, the UAV 10 has a fuselage 16 sized to be stored in an interior of the storage and launch tube 14. The UAV 10 includes a wing sub-assembly 18, a pair of tail fin sub-assemblies 20, and a propeller 22, each of which is movable back and forth between the deployed and stowed configuration. In the stowed configuration of this embodiment, the wing sub-assembly 18 is folded and rotated, the tail fin sub-assemblies 20 are rotated, and the propeller 22 is folded so that the UAV 10 can be compactly stored in the storage and launch tube 14. In this embodiment, as shown in FIG. 1A, the storage and launch tube 14 may contain a launch mechanism that launches the UAV 10 out of the storage and launch tube 14. As the UAV 10 exits the storage and launch tube 14, FIGS. 1B and 1C illustrate the wing sub-assembly 18, the tail fin sub-assemblies 20 and the propeller 22 automatically rotating and/or folding into the deployed configuration. For example, a wing body 24 of the wing sub-assembly 18 automatically rotates with respect to the fuselage 16, the wing extension members 26 automatically unfold into place, and the propeller 22 also unfolds away from the fuselage into place. Each tail fin sub-assembly 20 is also configured to automatically rotate with respect to the fuselage 16 when the UAV 10 is launched from the storage and launch tube 14. In this manner, the UAV 10 can convert itself from the stowed configuration to the deployed configuration within seconds of being launched from the storage and launch tube 14.

Figure 2B:
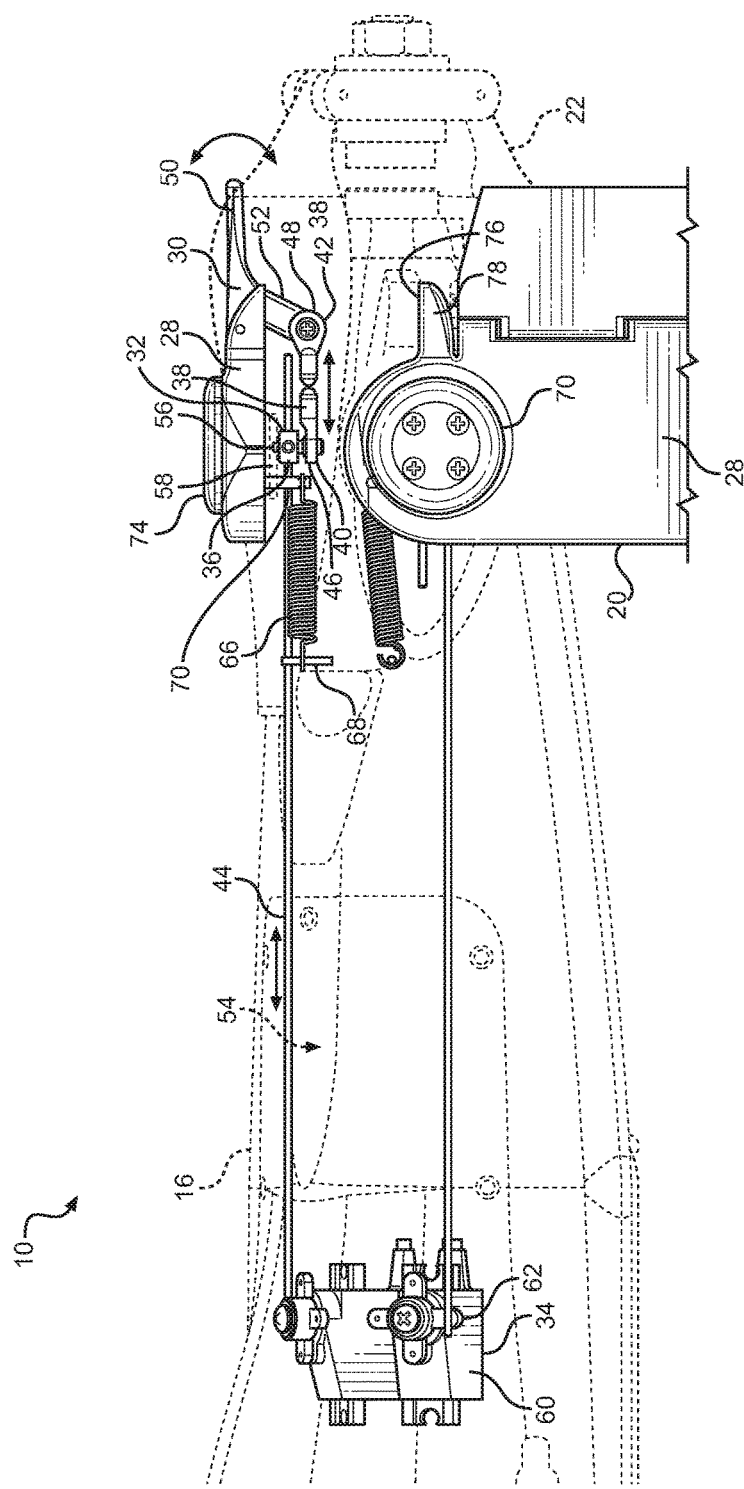
Figure 2C:
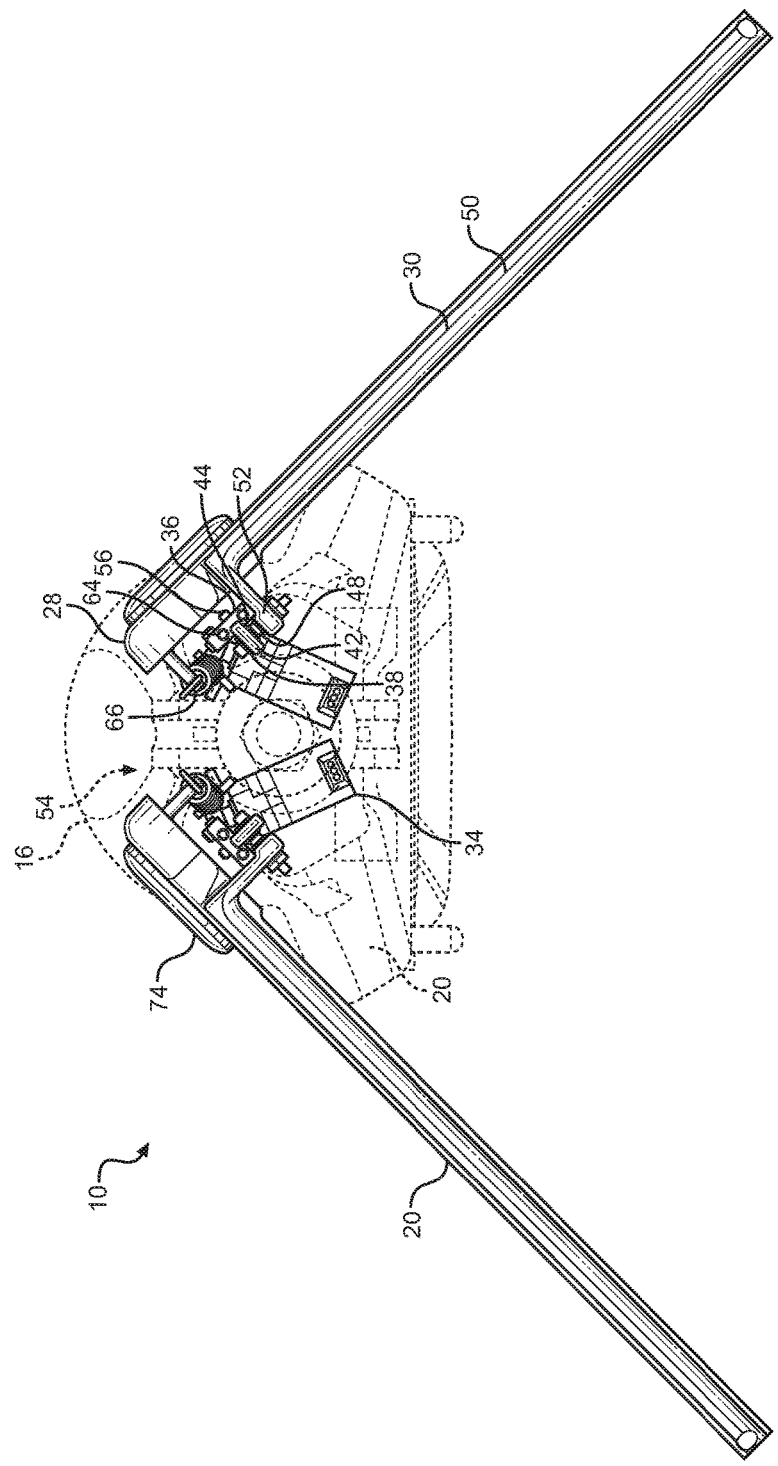

As discussed above, it is desirable to locate the heavier components within the fuselage 16, but this makes it difficult to mechanically control the movable elements located in the wing sub-assembly 18 and particularly in the tail fin sub-assemblies 20. In this regard, FIGS. 2A-2C illustrate internal components of the UAV 10 in the deployed configuration, to illustrate operation of the tail fin sub-assemblies 20 during flight. In particular, FIG. 2A is a bottom cutaway view, FIG. 2B is a top cutaway view at a 45-degree offset, and FIG. 2C is a rear cutaway view of the UAV 10. As shown by FIGS. 2A-2C, each tail fin sub-assembly 20 includes a fin 28 that is rotatably coupled to the fuselage 16, which allows the tail fin sub-assembly 20 to rotate back and forth between the deployed and stowed configuration. Each fin 28 has a control surface member 30 rotatably coupled thereto. In this embodiment, as shown by FIG. 2B, the tail fin sub-assembly 20 is arranged at a 45-degree downward angle with respect to the fuselage 16. This type of tail fin sub-assembly 20 is commonly called a ruddervator, because its control surface member 30 functions as a rudder and an elevator simultaneously. It should be understood, however, that aspects of the disclosed embodiments are equally applicable to other types of fins, such as, for example, a wing, a tailfin, rudder, etc.

In this embodiment, each tail fin sub-assembly 20 includes a control surface linkage 32 coupled between the control surface member 30 and an actuator 34 disposed in the fuselage 16. The control surface linkage 32 is configured to be actuated by the actuator 34 to rotate the control surface member 30 with respect to the fin 28. The control surface linkage 32 includes a translation member 36 configured to translate in a longitudinal direction with respect to the fuselage 16. A control link 38 is coupled between the translation member 36 at a first end 40 and the control surface 30 at a second end 42. In this embodiment, a pushrod 44 is connected between the translation member 36 and a respective actuator 34. The pushrod 44 extends substantially in the longitudinal direction and is fixed with respect to the translation member 36, such that actuating the actuator 34 moves the pushrod 44 and the translation member 36 in the longitudinal direction.

The first end 40 and the second end 42 of the control link 38 include a respective first ball link 46 coupled to the translation member 36 and second ball link 48 coupled to the control surface member 30. The first ball link 46 allows the control link 38 to rotate with respect to the translation member 36 with three degrees of freedom and the second ball link 48 permits the control link 38 to rotate with respect to the control surface member 30 with three degrees of freedom as well. In this embodiment, when the tail fin sub-assembly 20 and the control surface linkage 32 are in the deployed configuration, the control link 38 is substantially parallel to the longitudinal direction, and is aligned with the pushrod 44 and the translation member 36. As a result, actuating the actuator 34 causes the pushrod 44, the translation member 36, and the control link 38 to all move in the longitudinal direction in unison.

As discussed above, the second end 42 of the control link 38 is rotatably coupled to the control surface member 30 via the second ball link 48. The control surface member 30 includes a control surface 50 that is rotatable with respect to the fin 28, and an arm 52 that is fixed with respect to the control surface 50. The second ball link 48 of the control link 38 is rotatably coupled to the arm 52 such that moving the control link 38 in the longitudinal direction causes the arm 52 to rotate the control surface 50 with respect to the fin 28 about an axis substantially parallel to the fin 28 when the fin 28 is in the deployed configuration. As a result, when the fin 28 is in the deployed configuration, the actuator 34 is able to move the pushrod 44, the translation member 36, and the control link 38 in unison in the longitudinal direction to cause the arm 52 to rotate the control surface 50 with respect to the fin 28. In this embodiment, moving the pushrod 44, the translation member 36, and the control link 38 forward with respect to the fuselage 16 causes the control surface 30 to rotate down with respect to the fin 28, and moving the pushrod 44, the translation member 36, and the control link 38 rearward with respect to the fuselage 16 causes the control surface 30 to rotate up with respect to the fin 28. It should be understood, however, that other functional arrangements are contemplated.

In this manner, the actuator 34 can be disposed in an interior 54 of the fuselage 16 while retaining the ability to control the control surface member 30 of the rotatable fin 28. The actuator 34 includes a motor 60, such as a servo or a stepper motor for example, and a rotatable actuator arm 62 connected to the pushrod 44. As the actuator arm 62 rotates, the pushrod 44 moves forward or rearward substantially in the longitudinal direction, thereby moving the translation member 36 in the longitudinal direction as well. In this embodiment, the translation member 36 includes a protrusion 56 that slidably engages a slot 58 (See FIG. 2B) disposed in the interior of the fuselage 54. The translation member 36 is also slidably mounted about a guide rod 64 that extends parallel to the slot 58 and is fixed with respect to the fuselage 16. The slot 58 and the guide rod 64 both extend in the longitudinal direction and cause the translation member 36 to translate substantially in the longitudinal direction along the slot 58 when the actuator 34 actuates the pushrod 44 forward or rearward.

During operation of the UAV 10, each tail fin sub-assembly 20 is biased toward the deployed configuration by a respective tension spring 66. Each spring 66 is connected between a fuselage 16 spring pin 68 fixed to the interior 54 of the fuselage 16 and a fin spring pin 70 fixed to the fin 28. In this embodiment, the fin 28 has a circular recess 72 formed therein which matingly engages a gasket 74 coupled to the fuselage 16. The gasket 74 retains the fin 28 with respect to the fuselage 16 while permitting the fin 28 to rotate with respect to the fuselage 16 between the stowed and deployed configurations. In this embodiment, the fuselage 16 has a pair of fuselage stops 76 configured to engage and retain a complementary fin stop 78 on each fin 28 when the fin 28 is in the deployed configuration. In this manner, the spring 66 retains the fin 28 in the deployed configuration by biasing the fin 28 to engage the fin stop 78 with the respective fuselage stop 76.

Figure 3A:
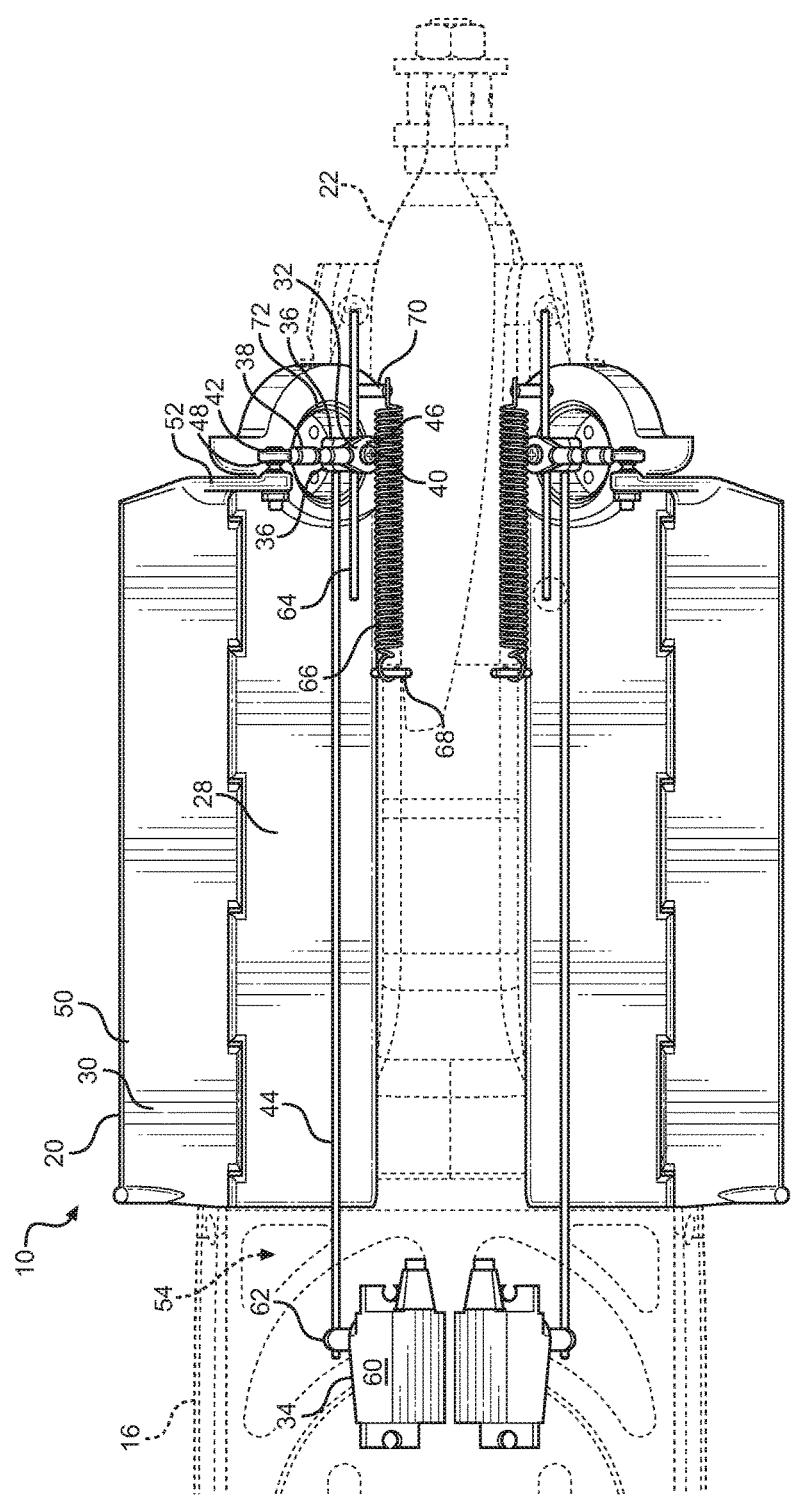
FIGS. 3A-3C illustrate internal components of the UAV of FIGS. 1A-2C in the stowed configuration, to illustrate operation of tail fin sub-assemblies of the UAV when stowed.
Figure 3B:
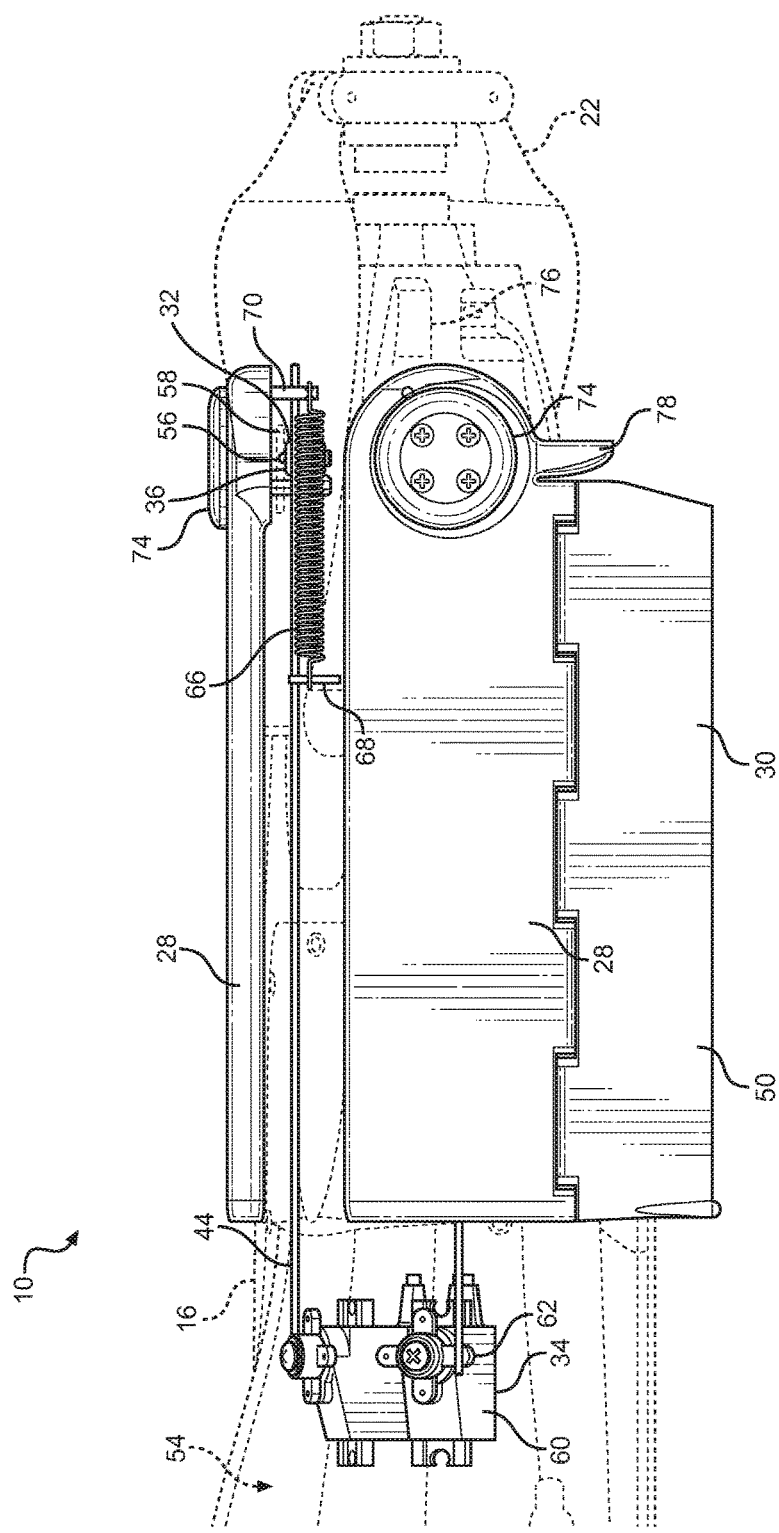
Figure 3C:
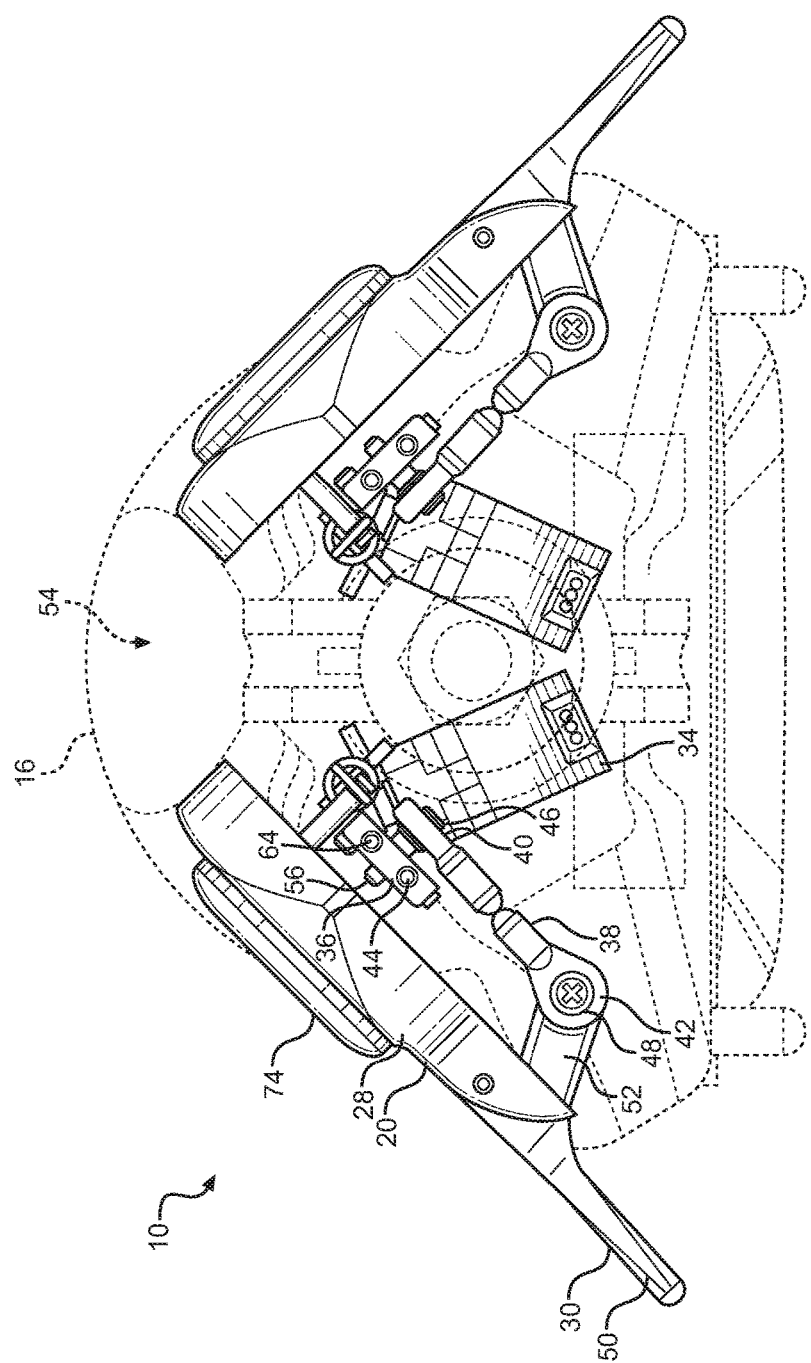

Having described the operation of the control surface linkage 32 when the tail fin sub-assembly 20 is in the deployed configuration, the arrangement and operation of the control surface linkage 32 when the tail fin sub-assembly 20 is in the stowed configuration will now be described with respect to FIGS. 3A-3C. In particular, FIGS. 3A-3C illustrate the same components of UAV 10 described above with respect to FIGS. 2A-2C, but in the stowed configuration. As shown by FIGS. 3A-3C, each fin 28 is rotated with respect to the fuselage 16 so as to be relatively flush and parallel with the fuselage 16. This permits the UAV 10 to be inserted into a storage receptacle, such as, for example, the storage and launch tube 14 described above with respect to FIG. 1A. Referring now to FIG. 3A, it can be seen that rotating the fin 28 causes the fin spring pin 70 to move away from the fuselage 16 spring pin 68, thereby extending and increasing tension in the spring 66. When the fin 28 is released, for example by being launched out of the storage and launch tube 14, the added tension in the spring 66 causes the fin 28 to quickly rotate back into the deployed configuration.

The control link 38 rotates with the fin 28 when the fin 28 is rotated to the stowed configuration. The control link 38 rotates about the first ball link 46 coupled to the translation member 36 at the first end 40 of the control link 38. When the translation member 36 is in a neutral position, the control link 38 is at a normal to the longitudinal direction. However, unlike in the deployed configuration, moving the translation member 36 in the stowed configuration, for example in response to actuating the actuator 34, will cause the control surface linkage 32 to move with respect to the fin 28 without rotating the control surface member 30. In this embodiment, actuating the actuator 34 instead causes the translation member 36 to rotate the control link 38 about the second ball link 48 coupled to the arm 52 of the control surface member 30 at the second end 42 of the control link 38. In this embodiment, the control link 38 rotates through an arc that includes the normal to the longitudinal direction. The movement characteristics of the control link 38 will be described below in greater detail with respect to FIGS. 6A and 6B.

Referring now to FIG. 4, a detail view of a portion of an inverted perspective view of the UAV 10 according to the embodiment of FIGS. 2A-3C in the stowed configuration is illustrated. This view includes a cutaway of the fuselage 16 to show elements of the control surface linkage 32, including the translation member 36, the pushrod 44, and the control link 38. The fuselage 16 includes a slot 80 that allows the control link 38 to extend from the translation member 36 in the interior 54 of the fuselage 16 at the first end 40 to the arm 52 of the control surface member 30 at the second end 42. The slot 80 also permits the control link 38 to rotate with the control surface member 30 as the fin 28 is rotated with respect to the fuselage 16 between the stowed configuration and the deployed configuration.

Figure 5:
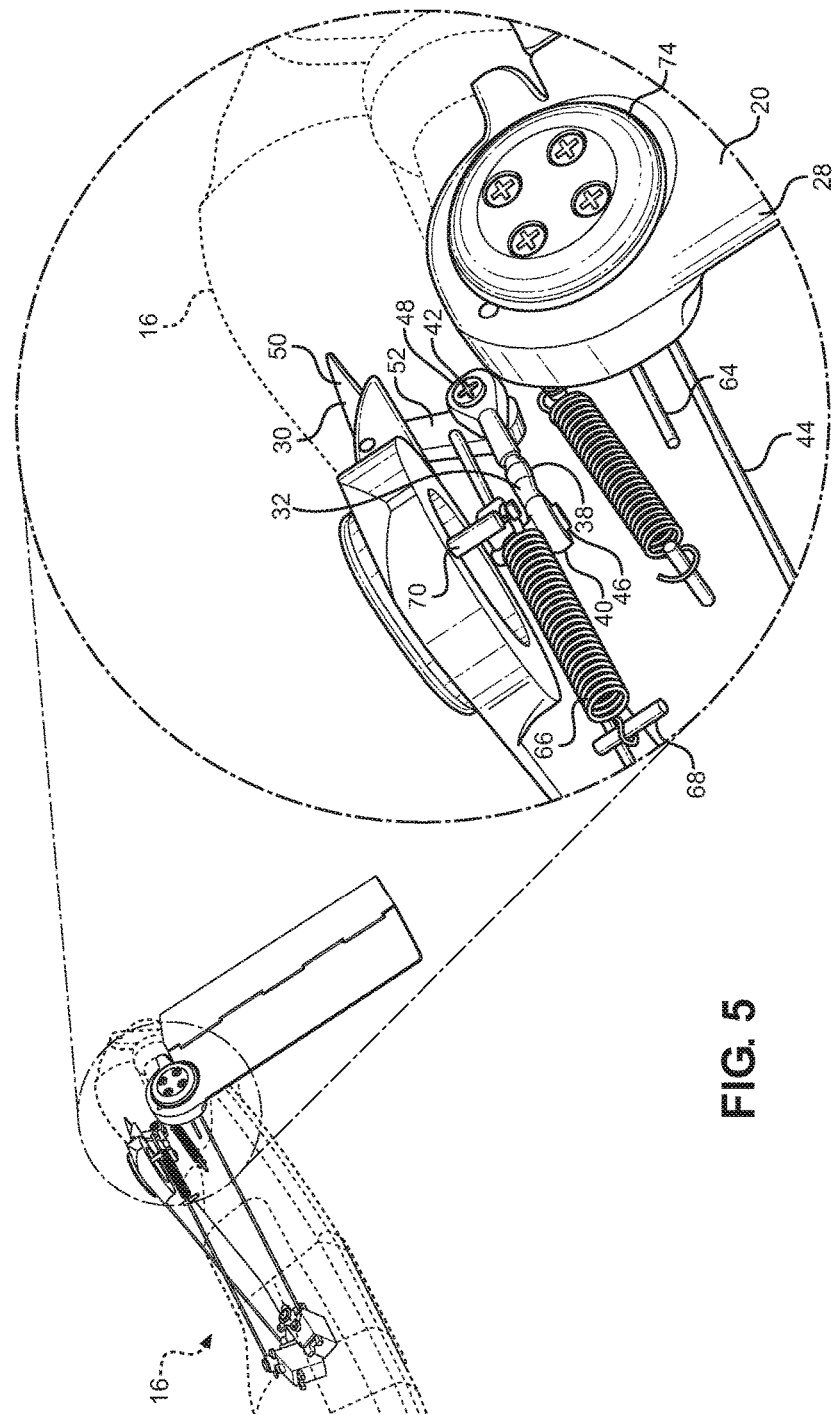
FIG. 5 illustrates a detail view of a portion of a perspective view of the UAV according to the embodiment of FIGS. 1A-4 in the deployed configuration.

In this regard, FIG. 5 is a detail view of a portion of a perspective view of the UAV 10 in the deployed configuration. As was described in detail above with respect to FIGS. 2A-2B, the control link 38 is substantially parallel with the longitudinal direction when the control surface member 30 is in the deployed configuration, thereby permitting the pushrod 44, the translation member 36, and the control link 38 to be actuated in unison to rotate the control surface member 30 with respect to the fin 28.

Figure 6A:
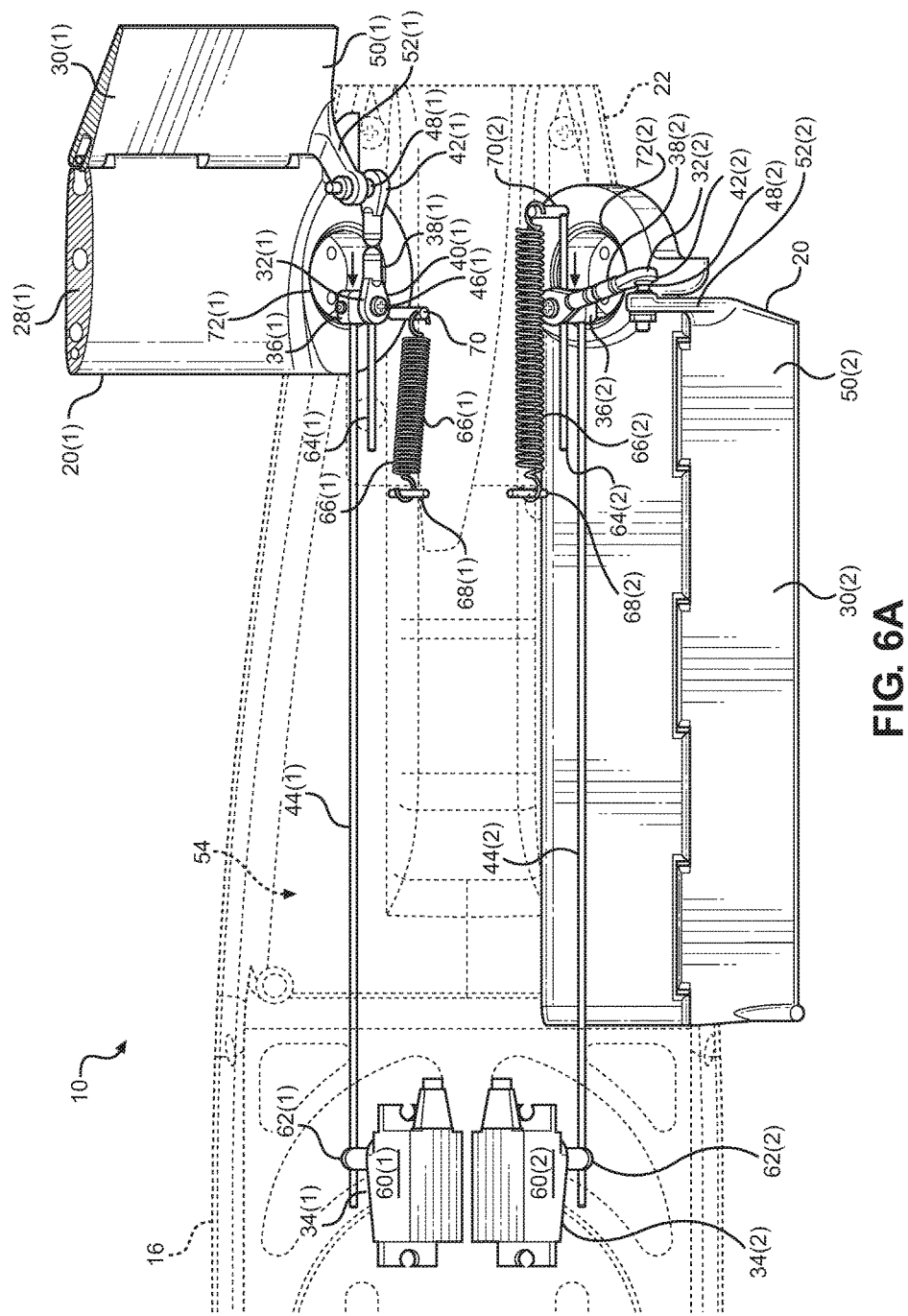

To further illustrate the movement and operation of the control link 38 in the stowed and deployed configurations, FIGS. 6A and 6B illustrate bottom cutaway views of the UAV 10, with the left fin 28(1) in the deployed configuration and the right fin 28(2) in the stowed configuration. For convenience, elements corresponding to the left side of the UAV 10 include a (1) designation below, and elements corresponding to the right side of the UAV 10 include a (2) designation below. In all other respects, the elements of FIGS. 6A and 6B correspond to elements discussed above with respect to FIGS. 1A-5.

In FIG. 6A, the left actuator 34(1) pulls the left pushrod 44(1) forward, thereby moving the left translation member 36(1) forward in the longitudinal direction. The left control link 38(1) is substantially parallel with the longitudinal direction because the left fin 28(1) is in the deployed configuration. As a result, the forward movement of the left control link 38(1) pulls the left arm 52(1) forward and causes the left control surface 50(1) of the left control surface member 30(1) to rotate downwardly with respect to the left fin 28(1).

In contrast, the right fin 28(2) of FIG. 6A is in the stowed configuration. Here, when the right actuator 34(2) causes the right translation member 36(2) to move forward, the right control link 38(2) rotates forward about the second ball link 48(2) coupled to the right arm 52(2) of the right control surface member 30(2) at the second end 42(2). In this embodiment, the first ball link 46(2) and second ball link 48(2) allow the control link 38 to rotate and twist with respect to the translation member 36(2) and arm 52(2) as needed when the fin 28(2) is in the stowed configuration, regardless of whether the translation member 36(2) is moved forward with respect to the fuselage 16.

Similarly, FIG. 6B illustrates movement and operation of the control link 38 in the stowed and deployed configurations when the translation members 36 are moved rearward by the actuators 34. Here again, because the left control link 38(1) is substantially parallel with the longitudinal direction when the left fin 28(1) is in the deployed configuration, movement of the left translation member 36(1) rearward causes the left control link 38(1) to push the left arm 52(1) rearward and causes the left control surface 50 of the left control surface member 30(1) to rotate upwardly with respect to left the fin 28(1). In contrast, when the right actuator 34(2) causes the right translation member 36(2) to move rearward, the right control link 38(2) rotates rearward about the right second ball link 48(2) coupled to the right arm 52(2) of the right control surface member 30(2) at the right second end 42(2), without moving the right control surface member 30(2) or causing any stress or damage to the right first ball joint 46(2), the second ball joint 48(2), or any other part of the right control surface linkage 32(2).

In the above embodiments, the translation member 36 is entirely disposed in the interior 54 of the fuselage 16, and the control link 38 is partially disposed in the interior 54 of the fuselage 16. One advantage of this arrangement is that, by disposing as many components as possible in the interior 54 of the fuselage 16, the UAV 10 can have fewer protuberances into the airstream around the UAV 10 during flight, thereby improving the aerodynamic profile and flight characteristics of the UAV 10. In other embodiments, however, space constraints may nevertheless require that additional components be disposed outside the aircraft.

Figure 7:
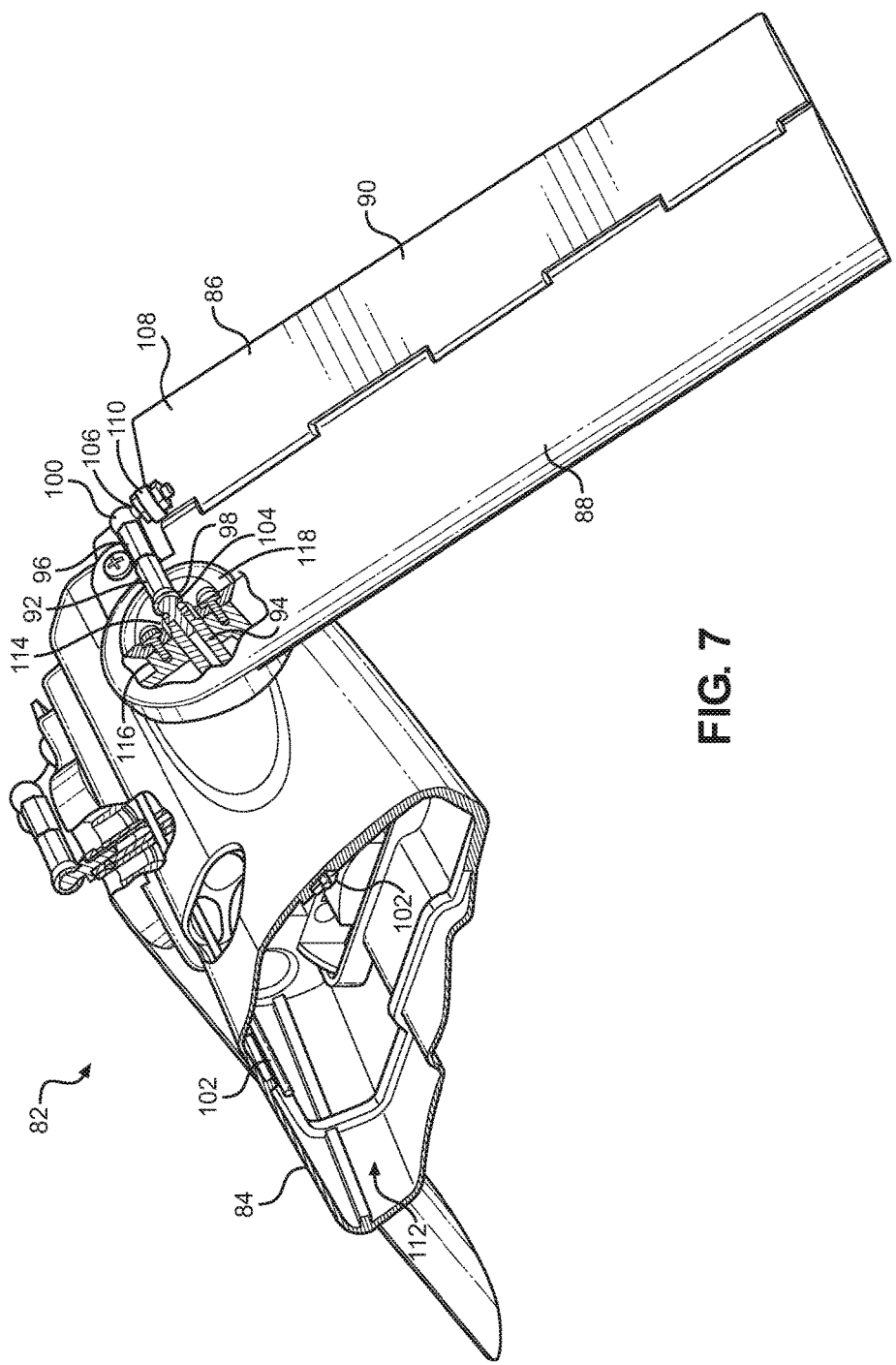
FIG. 7 illustrates a partial cutaway view of a UAV according to an alternate embodiment, with portions of a control surface linkage disposed outside the fuselage of the UAV.

In this regard, FIG. 7 illustrates partial cutaway view of a UAV 82 according to an alternate embodiment. In this embodiment, the UAV 82 includes a fuselage 84 having an alternative tail fin sub-assembly 86. The tail fin sub-assembly 86 includes a fin 88 rotatable about the fuselage 84 and a control surface member 90 rotatable about the fin 88. The UAV 82 also includes an alternate control surface linkage 92 having a translation member 94 extending through the fuselage 84 and a control link 96 rotatably coupled between the translation member 94 at a first end 98 and the control surface member 90 at the second end 100, with the entire control link 96 disposed outside the fuselage 84.

A pushrod 102 coupled to an actuator (not shown) moves the translation member 94, which causes the control link 96 to move the control surface member 90 via first ball link 104 and second ball link 106. The control surface member 90 includes a control surface 108 and arm 110 fixed with respect to the control surface 108 and rotatably coupled to the second ball link 106. In this embodiment, the pushrod 102 moves the translation member 94 along the longitudinal direction within a slot 114 that is fixed with respect to the fuselage 84, thereby causing the control link 96 to control the control surface member 90 when the fin 88 is in the deployed configuration and to move with respect to the control surface member 90 without moving the control surface member 90 when the fin 88 is in the stowed configuration (not shown). In this embodiment, each fin 88 has a circular recess 116 formed therein which matingly engages a gasket 118 coupled to the fuselage 84. The gasket 118 retains the fin 88 with respect to the fuselage 84 while permitting the fin 88 to rotate with respect to the fuselage 84 between the stowed and deployed configurations. In this embodiment, the slot 114 is formed in the gasket 118, thereby permitting the translation member 94 to move in the longitudinal direction along the slot 114, thereby permitting full movement of the control surface member 90 when the fin 88 is in the deployed configuration while minimizing movement of the control surface member 90 when the fin 88 is in the stowed configuration.

Like reference numbers are used for the same element throughout the FIGS. 8A-8B, 9, 10A-10B, 11A-11B, 12A-12C, 14A-14C, 15A-15C, 16A-16C, 17A-17C, and 18A-18C. Therefore, some figures may include reference numbers designating components previously described in other figures. Reference numbers designating a component previously described may in some instances not be repeated in the text although shown in a Figure.

Figure 8A:
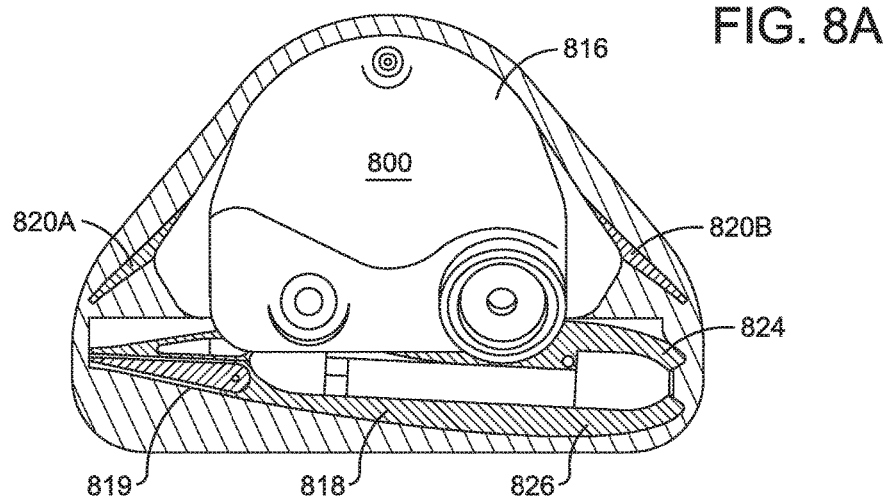
FIG. 8A is a front view of a UAV 800 in a tube in a stowed position.
Figure 8B:
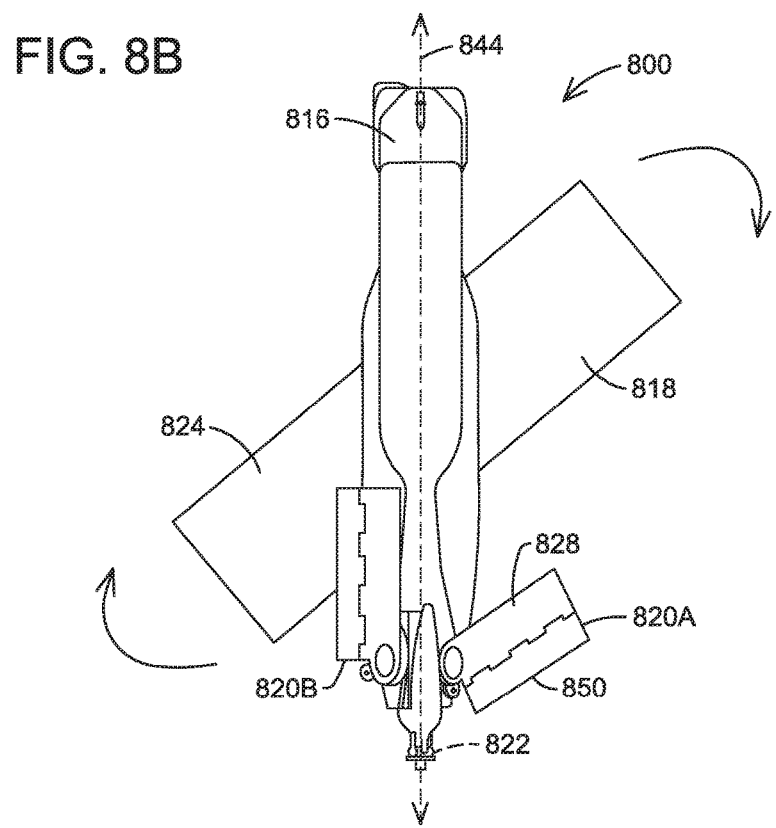
FIG. 8B is a top plan view of the UAV in an intermediary deploying position.

Referring now to FIGS. 8A-8B, FIG. 8A is front view of a UAV 800 in a stowed configuration such as when disposed in a storage and launch tube 814 (FIG. 9); and FIG. 8B is a top view of the UAV 800 in an intermediary deploying configuration. The UAV 800 is part of a portable launch system that also comprises the storage and launch tube 814 (FIG. 9). In this embodiment, the UAV 800 has a fuselage 816, a wing sub-assembly 818, a pair of tail fin sub-assemblies 820A and 820B, and a propeller 822, (each of which is movable back and forth between the deployed and stowed configuration. The UAV 800 is configured to fit within an interior cavity in the storage and launch tube 814.

As used herein, the stowed configuration refers to when the wing sub-assembly 818 is oriented parallel or close to parallel to the fuselage 816 sufficient to allow stowage in the storage and launch tube 814. The stowed configuration also refers to one or both of the tail fin sub-assemblies 820A, 820B oriented parallel or close to parallel to the fuselage 816 sufficient to allow stowage in the launch tube 814. The deployed configuration refers to when the wing sub-assembly 818 is oriented for flight relative to the fuselage 816. The deployed configuration also refers to one or both of the tail fin sub-assemblies 820A, 820B oriented for flight relative to the fuselage 816

The pair of tail fin sub-assemblies 820A and 820B may sometimes be referred to as a right hand (RH) tail fin sub-assembly 820A and a left hand (LH) tail fin sub-assembly 820B. Likewise, any component described here may be followed with the letter "A" when referring to the starboard (e.g. right) side, and the letter "B" when referring to the port (e.g. left) side.

In the stowed configuration of this embodiment, the wing sub-assembly 818 is folded and rotated such that a length of the wing sub-assembly 818 is oriented to be parallel (or more parallel) to the length (longitudinal axis 844) of the fuselage 816. In the stowed configuration, the pair of tail fin sub-assemblies 820A and 820B are rotated to be parallel (or more parallel) with a longitudinal axis of the fuselage 816 and retained by a pair of independent tail fin latch and release devices 1000A and 1000B (FIG. 14B). In the stowed configuration of this embodiment, the propeller 822 is folded so that the UAV 800 can be compactly stored in the storage and launch tube 814. For the sake of brevity, the operation of the propeller 822 will not be described. The operation of propeller 822 is similar to propeller 22 previously described.

As viewed in FIG. 8B, during deployment of the pair of tail fin sub-assemblies 820A and 820B and the unfolding of the wing sub-assembly 818, the wing sub-assembly 818 is canted with respect to the fuselage 816 such that a portion of the wing body 824, in this case, on the port (left) side of the fuselage 816, overlaps in space the LH tail fin sub-assemblies 820B when viewed from the perspective shown in FIG. 8B. Hence, when deploying the wing sub-assembly 818 and the pair of tail fin sub-assemblies 820A and 820B from the stowed configuration, the port (left) tail fin sub-assembly 820B may be obstructed by the portion of the wing body 824 of the wing sub-assembly 818. In some embodiments, the wing sub-assembly 818 and/or the tail fin sub-assemblies 820A, 820B may include a control surface. Each tail fin sub-assembly 820A, 820B include a fin 828 and a control surface 850. In an example embodiment, the control surface 850 of the LH tail fin sub-assembly 820B may be obstructed or damaged by the unfolding movement of the wing sub-assembly 818. The wing sub-assembly 818 includes control surface 819. However, the UAV design may change the rotation of the wing sub-assembly 818 to deploy for a different position or opposite the rotation direction of FIG. 8B. Thus, the RH tail fin sub-assembly 820A would be obstructed in such case. In such case, the principles disclosed herein apply, though directions/sides etc. of operation and components may be reversed.

As best seen in FIG. 8B, the starboard (right) tail fin sub-assembly 820A has the necessary clearance from the deploying wing sub-assembly 818.

Each tail fin sub-assembly 820A and 820B is configured to automatically rotate independently with respect to the fuselage 816 when the UAV 800 is launched from the storage and launch tube 814 in a timed sequence responsive to a profile of the wing body 824 and its rotation. In some embodiments, a profile of the wing body 824 and its rotation are used to effectuate a timed release of a right hand (RH) spring-loaded release pin 1050A and a left hand (LH) spring-loaded release pin 1050B, independently for the independent release of the RH tail fin sub-assembly 820A and the LH tail fin sub-assembly 820B.

For example, as a wing body 824 of the wing sub-assembly 818 automatically rotates with respect to the fuselage 816, the wing extension members 826 (FIG. 8A) automatically unfold into place, and the propeller 822 also unfolds away from the fuselage into place.

FIG. 9 illustrates a trajectory represented as a dashed arc along which a UAV flies to deploy the UAV 800 from a stowed configuration to a fully deployed configuration. The UAV 800 is launched from the storage and launch tube 814. In the storage and launch tube 814, the longitudinal axis 844 (FIG. 8B) of the wing body 824A is generally aligned and oriented parallel with the longitudinal axis 844 of the fuselage 816. After launch, the UAV 800 unfolds in flight where a first tail fin sub-assembly 820A is deployed and unfolds independently. Simultaneously, the wing body 824B rotates to an angled or sloped position, such as described in relation to FIG. 8B. The RH tail fin sub-assembly 820A may provide for flight stability during the unfolding and deployment states of the UAV 800 while the LH tail fin sub-assembly 820B remains latched or locked to the fuselage 816

As the UAV 800 deploys and when the wing body 824C becomes essentially perpendicular to the fuselage 816, the LH tail fin sub-assembly 820B may be released for deployment. When the tail fin sub-assembly 820B is deployed, it rotates into its deployed state. Thereafter, the propeller 822 is fully deployed and the wing body 824D may remain in the deployed state perpendicular to the fuselage 816.

In this manner, in some embodiments, the UAV 800 may convert itself from the stowed configuration to the deployed configuration in less than a second of being launched from the storage and launch tube 814. The independently unfolding tail fin design is configured and arranged to not impede the wing body deployment of the wing sub-assembly 818.

As illustrated in FIG. 8B, the RH side of the wing body 824 is rotated rearward to a position which is essentially perpendicular to the longitudinal axis of the fuselage 816. Simultaneously, the LH side of the wing body 824 is rotated forward to a position which is essentially perpendicular to the longitudinal axis of the fuselage 816.

Figure 10A:
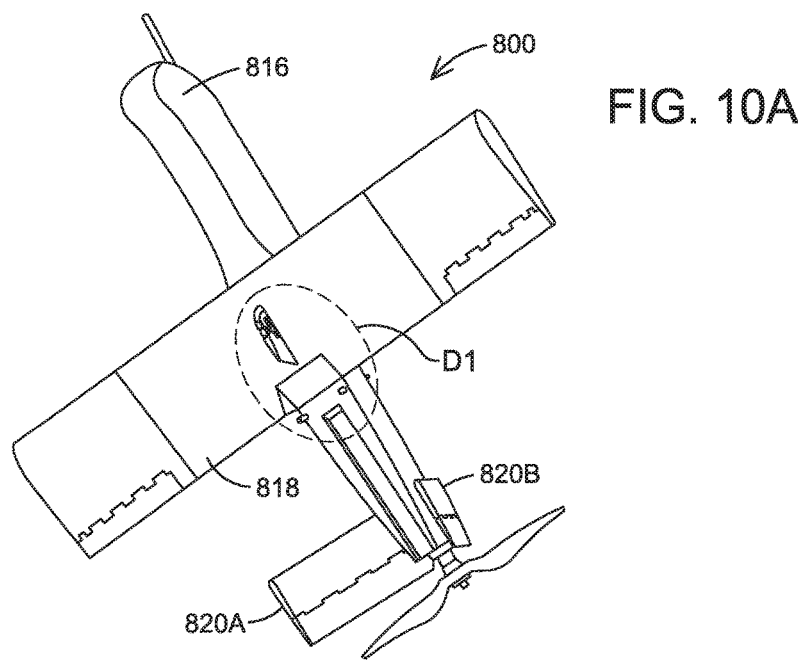
FIG. 10A illustrates an underside of a deployed UAV.
Figure 10B:
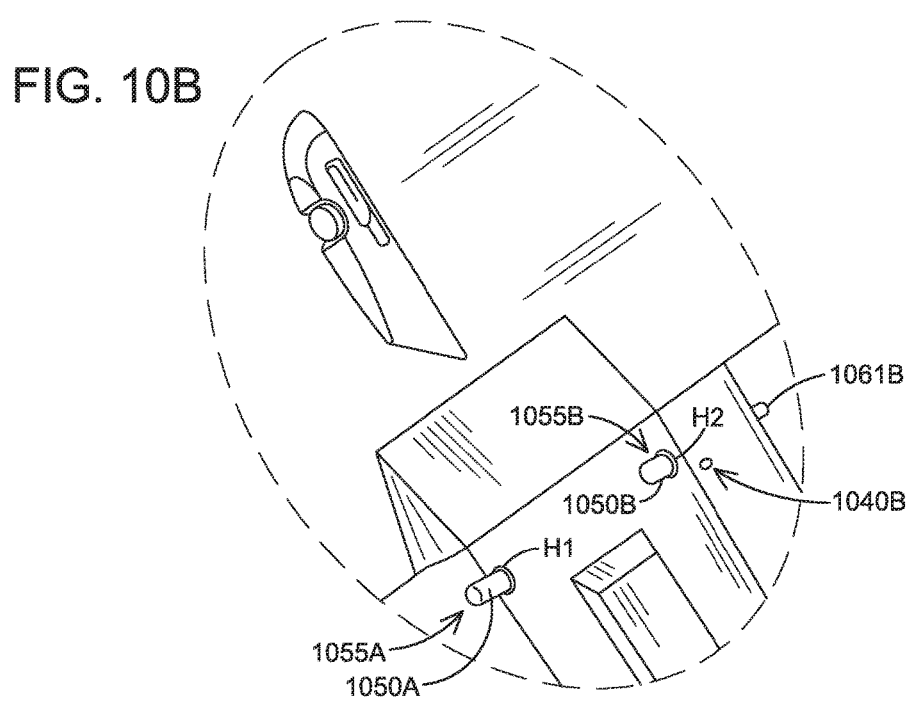
FIG. 10B illustrates a partial detail view D1 of an underside of the deployed UAV.

FIG. 10A illustrates an underside of a deployed UAV 800 and shows area D1. In this view, the wing sub-assembly 818 is deployed relative to the fuselage 816 and the tail fin sub-assemblies 820A and 820B are deployed. FIG. 10B illustrates a partial detail view of area D1 of the underside of the deployed UAV 800. A set of spring-loaded release pins 1050A and 1050B is shown protruding through respective holes H1 and H2 formed in the fuselage 816. The holes H1 and H2 are on opposite sides (right and left respectively) of the fuselage 816. In some embodiments, the center of the hole H2 is parallel with the center of hole H1. In some embodiments, the center of the holes H1 and H2 are diametrically opposing and positioned near the lateral sides of the fuselage 816. The spring-loaded release pins 1050A and 1050B each have a lower portion denoted at 1055A, 1055B which protrudes through a underside of the fuselage 816 and an upper portion (only portion 1061B shown) which protrudes through the top side of the fuselage 816, as will be described in more detail in relation to FIG. 11B. The fuselage 816 also includes holes for the insertion of retainer pins (only pin 1040B shown).

Figure 13:
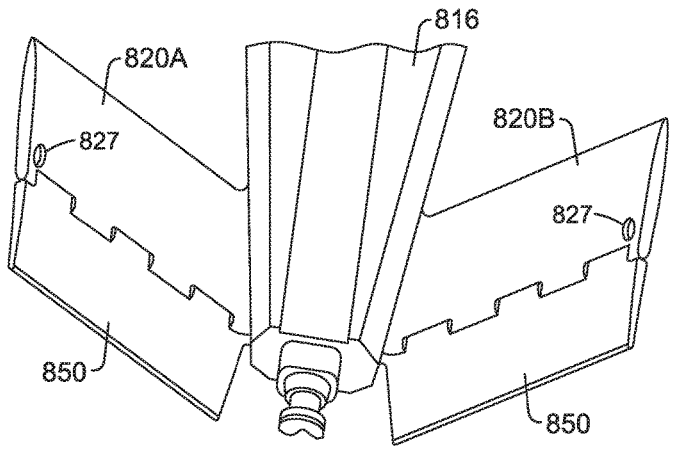
FIG. 13 illustrates an underside of the tail fin sub-assembly.

Referring also to FIG. 13, an underside of the tail fin sub-assemblies 820A and 820B is shown. The free end of each tail fin sub-assemblies 820A and 820B includes a fin 828 and control surface 850 with a tail fin pocket 827 in the fin 828. When the tail fin sub-assemblies 820A and 820B are in a folded (undeployed state), each spring-loaded release pins 1050A and 1050B (FIG. 10B) include an upper portion which protrudes into a respective tail fin pocket 827, as will be described in more detail below. This interaction holds the tail fin sub-assemblies 820A, 820B in place in the stowed configuration latched to the fuselage 816 (FIG. 14B).

Referring also to FIG. 11A, a side view of a deployed UAV 800 is shown wherein FIG. 11B illustrates the detail view "D2" of FIG. 11A, showing the spring-loaded release pin 1050B (left hand) in the foreground and the spring-loaded release pin 1050A (right hand hand) in the background. In FIG. 11A, a portion of the fuselage 816 is removed for the detail view "D2" to be shown. FIG. 12A illustrates a cross sectional view along the plane E-E of FIG. 11B. FIG. 12B illustrates an exploded view of one spring-loaded release pin 1050A. FIG. 12C illustrates a release pin member 1050A.

A pair of independent tail fin latch and release devices 1000A, 1000B (best seen in FIG. 14B), independently latch the tail fin sub-assemblies 820A and 820B respectively when the wing body 824 is stowed at a first angle along an underside of a fuselage 816 of a flight vehicle. FIG. 14B illustrates devices 1000A, 1000B so the description is also in reference to at least FIG. 14B. Since each device 1000A and 1000B is essentially the same, only one such device 1000B will be described in detail. Each tail fin latch and release devices 1000A, 1000B includes: a release pin column 1010B configured to be mounted in a shoulder of the fuselage 816, the release pin column 1010B including an elongated channel CH1 having opposite end open through the fuselage 816; a spring biased release pin 1050B being spring biased in the elongated channel CH1. The spring biased release pin 1050B comprises a collar 1057B, a release pin tail retention end 1061B (sometimes referred to as the upper portion 1059B or first end) configured to latch to a respective one tail fin sub-assembly 820B in a latched state and the release pin ball end 1055B (sometimes referred to as the lower portion or second end) configured to ride along a top wing surface of the wing body 824 during deployment of the wing body 824, wherein the first end and second end being separated by the collar 1057B. A spring 1060B is positioned with the column and spiraled around the first end to bias the spring biased release pin 1050B in an unlatched state such that as the wing body 824 clears the second end, the spring 1060B expands or de-compresses to unlatch the spring biased release pin 1050B. The spring 1060B applies pressure to the collar 1057B which in turn pushes the spring biased release pin 1050B through the underside of the fuselage 816 to unlatch the respective tail fin sub-assembly 820B.

The wing sub-assembly 818 is sloped or angled such that one side of the wing sub-assembly 818 is in close proximity to the fuselage 816 near the LH tail fin sub-assembly 820B. (See e.g. FIG. 14B). To accommodate this, the spring-loaded release pins 1050A, 1050B have varying length release pin members. Specifically, in an example embodiment, spring-loaded release pin 1050A is longer to accommodate the curvature of the wing body 824 that causes a surface of the wing body 824 to be farther away from the fuselage 816 where the spring-loaded release pin 1050A is located.

The spring-loaded release pins 1050A, 1050B include a release pin ball end 1055A, 1055B at one end of the release pin members, and a release pin tail retention end 1061A, 1061B at the other end. A collar 1057A, 1057B is provided on the spring-loaded release pin 1050A, 1050B which is configured to limit the movement up and down within the channel in release pin column (i.e., release column 1010B). The two spring-loaded release pins 1050A, 1050B are compression spring-loaded and held in place with two independent retention columns using a set of small retainer pins 1040A, 1040B positioned at a location in the column closer the underside of the fuselage 816.

In the stowed condition, release pin tail retention end 1061A, 1061B penetrate respective tail fin sub-assemblies 820A and 820B to hold them in place.

Figure 14A:
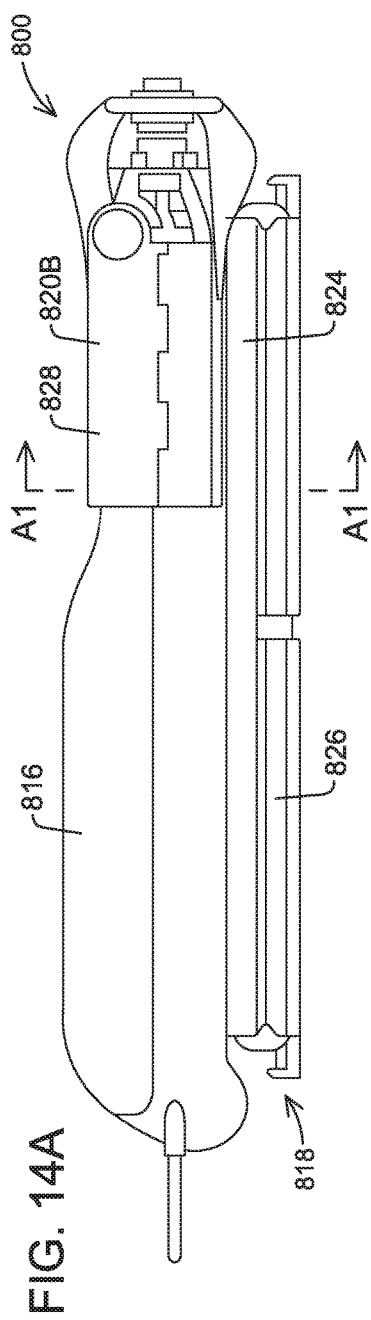
FIG. 14A illustrates a side view of the UAV with the wing sub-assembly and tail fin sub-assembly in the stowed state.
Figure 14B:
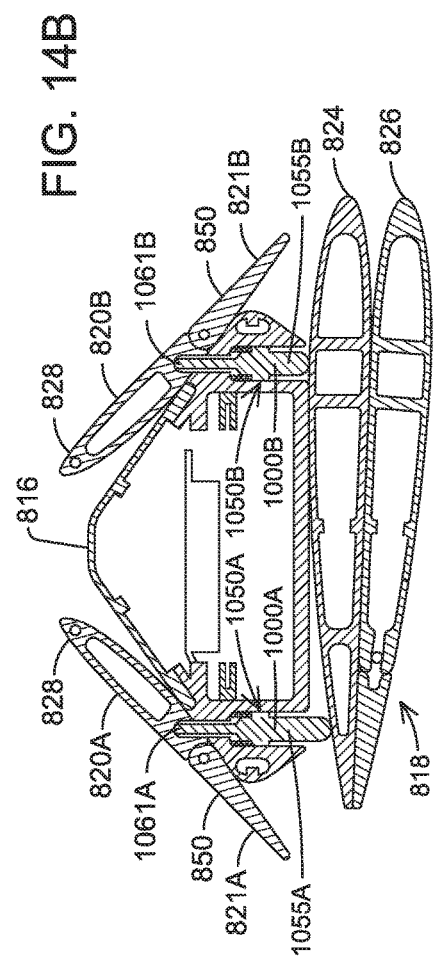
FIG. 14B illustrates a cross sectional view along section A1-A1 of FIG. 14A.
Figure 14C:
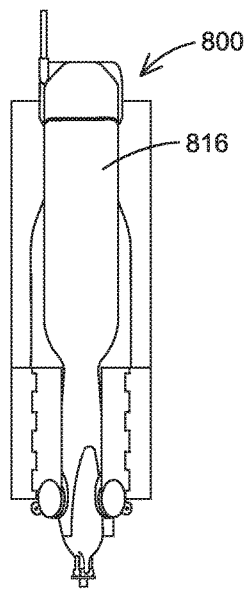
FIG. 14C illustrates a top perspective view of the UAV of FIG. 14A in the stowed state.

FIG. 14A illustrates a side view of the UAV 800 with the wing sub-assembly 818 and tail fin sub-assemblies 820A and 820B in the stowed state. FIG. 14B illustrates a cross sectional view along section A1-A1 of FIG. 14A. FIG. 14C illustrates a top perspective view of the UAV 800 of FIG. 14A in the undeployed stowed state. As best seen in FIG. 14B, the spring-loaded release pins 1050A and 1050B ride upon the top surface of a stowed wing body 824 of the wing sub-assembly 818. The release pin tail retention end 1061A of spring-loaded release pin 1050A is biased to protrude into or within tail fin pockets 827 of tail fin 828 of tail fin sub-assembly 820A based on the contact of the release pin ball end 1055A as it contacts the wing body 824. Likewise, the release pin tail retention end 1061B is biased to protrude into or within tail fin pockets 827 of tail fin 828 of tail fin sub-assembly 820A based on the contact of the release pin ball end 1055B as it contacts the wing body 824.

Hence, both tail fins 828 of the tail fin sub-assemblies 820A and 820B are latched and locked in a stowed state. Likewise, the wing sub-assembly 818 is in a stowed state such that a lateral axis of the wing body 824 is parallel to the longitudinal axis of the fuselage 816. The lateral axis of the wing body 824 has approximately 0 offset (first angle) from the longitudinal axis.

A need exists for a mechanism to release stowed flight control surfaces (i.e., the pair of tail fin sub-assemblies 820A and 820B) of a small cruise missile or UAV after launching from a launch tube 814 in a stowed condition. Each of the flight control surfaces (i.e., the pair of tail fin sub-assemblies 820A and 820B) require a different release time in relation to the missile's deploying wing sub-assembly 818. Timing should occur in the correct order and the precise time to prevent physical binding of the elements (wing body 824 and tail fin 828) in motion and to allow the flight control surface (release tail fin 828) to provide aerodynamic stability early in the launch phase. The arrangement disclosed herein meets this need.

In operation, the spring-loaded release pins 1050A and 1050B ride upon the top surface of a stowed wing body 824. Deployment of the wing body 824 on which the spring-loaded release pins 1050A and 1050B were resting causes the spring-loaded release pins 1050A and 1050B to lower under the bias of the respective spring 1060A, 1060B. This lowers the respective release pin tail retention ends 1061A, 1061B, which disengage from the tail fin pockets 827. This releases the tail fin sub-assemblies 820A and 820B, which are then free to rotate from the stowed configuration to the deployed configuration. However, due to the rotation, the wing body 824 first rotates out from under the starboard (right) spring-loaded release pin 1050A. Only after the wing body 824 rotates nearly fully to the deployed configuration does the wing body 824 rotate out from under the port (left) spring-loaded release pin 1050B. This causes a delay between the time the starboard tail fin sub-assembly 820A begins deploying and the time the port tail fin sub-assembly 820B begins deploying. This delay is tied to the position of the wing body 824 and therefore is always enough to ensure the wing body 824 is clear before the port tail fin sub-assembly 820B deploys, thereby preventing any interference there between. Since this arrangement is purely mechanical and dependent on the position of the wing body 824, there should never be interference.

Figure 15C:
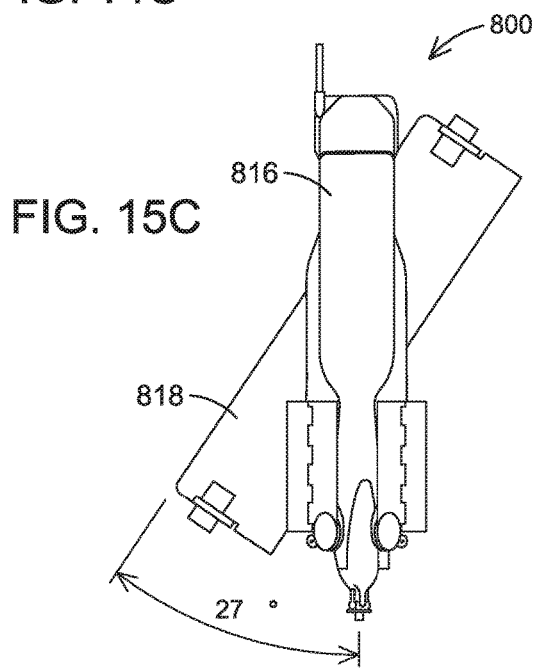
FIG. 15C illustrates a top perspective view of the UAV of FIG. 15A.

FIG. 15A illustrates a side view of the UAV 800 with the wing sub-assembly 818 partially unfolded and the right hand tail fin sub-assembly 820A on a verge of release from the stowed state. FIG. 15B illustrates a cross sectional view along section A2-A2 of FIG. 15A. FIG. 15C illustrates a top perspective view of the UAV 800 of FIG. 15A. As best seen in FIG. 15B, the spring-loaded release pins 1050A rides upon the top surface of a rotating (deploying) wing body 824 of the wing sub-assembly 818 until the top surface of the rotating (deploying) wing body 824 clears the spring-loaded release pin 1050A. As, the spring-loaded release pin 1050A clears the wing body 824, the force exerted by the wing body 824 to push the spring-loaded release pin 1050A upward (latching location) ceases. Thereafter, the spring-loaded release pin 1050A is able to fall downward below the fuselage 816. As the spring-loaded release pin 1050A falls, the release pin tail retention end 1061A falls or slides out of the tail fin pockets 827 of tail fin 828 of tail fin sub-assembly 820A. Hence, the tail fin 828 of the tail fin sub-assembly 820A deploys.

The release pin tail retention end 1061B of release pin 1050B remains biased to protrude into or within tail fin pockets 827 of tail fin 828 of tail fin sub-assembly 820B based on the contact of the release pin ball end 1055B as it contacts the wing body 824.

Hence, tail fin 828 of the tail fin sub-assembly 820A is released independent from the release of the tail fin 828 of tail fin sub-assembly 820B. By way of non-limiting example, the wing sub-assembly 818 is rotated, by way of non-limiting example, approximately 27° before release of the starboard spring-loaded release pin 1050A. In other words, when viewed from above from the perspective seen in FIG. 15C, a longitudinal axis of the wing body 824 may rotate approximately 27° before the starboard spring-loaded release pin 1050A drops and releases the starboard tail fin sub-assembly 820A to deploy. Similarly, the wing sub-assembly 818 is rotated, by way of non-limiting example, approximately 83.5° before release of the port spring-loaded release pin 1050B. In other words, when viewed from above from the perspective seen in FIG. 17C, a longitudinal axis of the wing body 824 may rotate, by way of non-limiting example, approximately 83.5° from the longitudinal axis of the fuselage 816 before the port spring-loaded release pin 1050B drops and releases the port tail fin sub-assembly 820B.

Figure 16C:
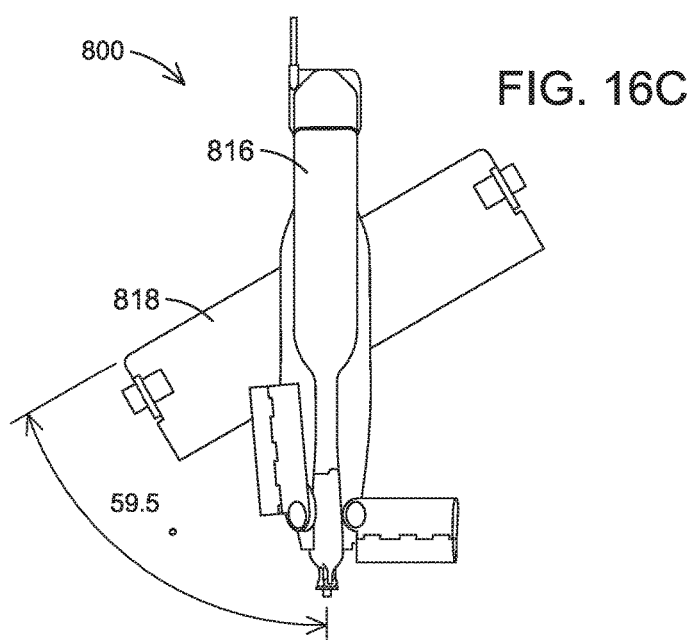
FIG. 16C illustrates a top perspective view of the UAV of FIG. 16A.
Figures 16A, 16B:
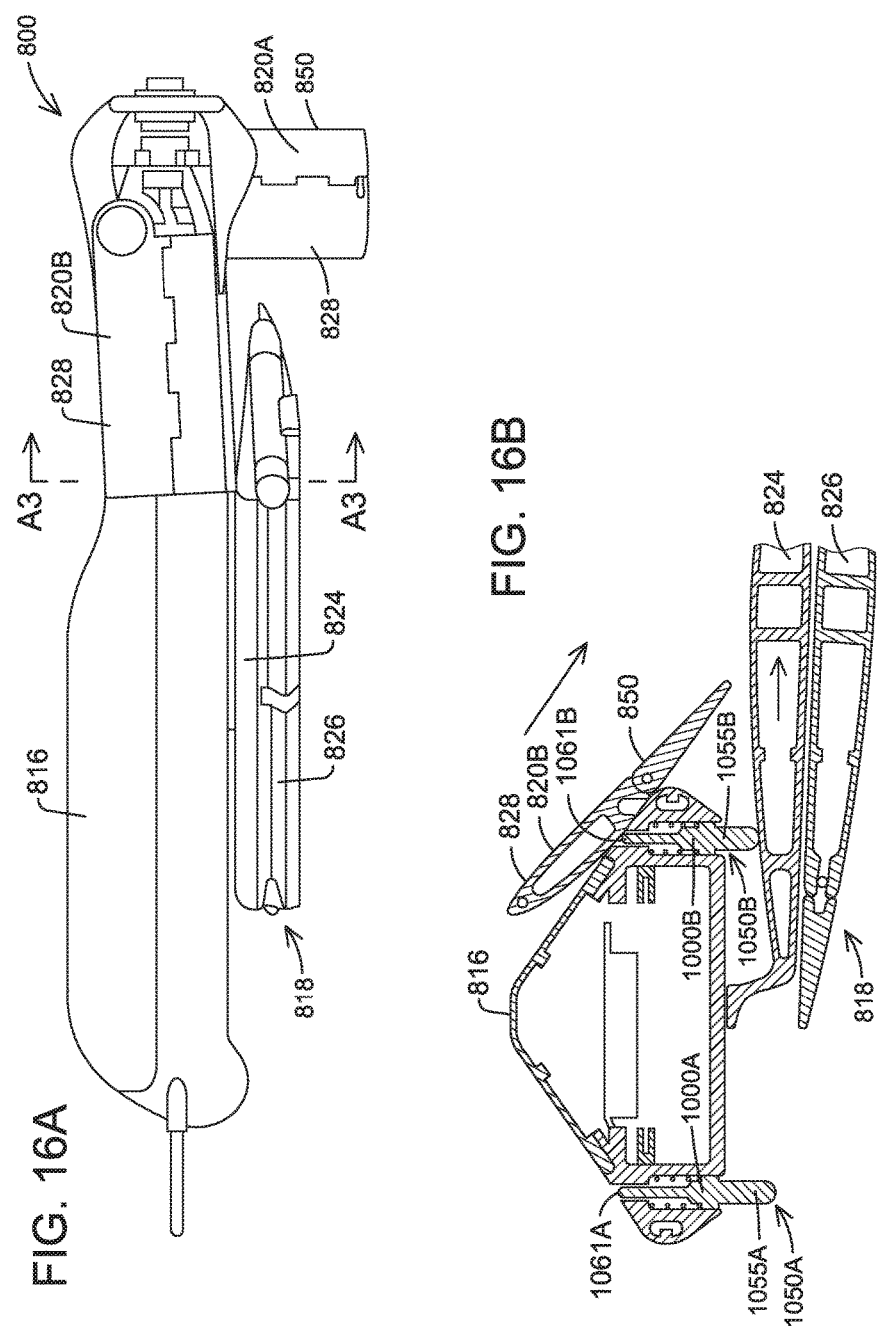

FIG. 16A illustrates a side view of the UAV 800 with the wing sub-assembly 818 partially unfolded and the left hand tail fin sub-assembly 820A on the verge of release from the stowed state. FIG. 16B illustrates a cross sectional view along section A3-A3 of FIG. 16A. FIG. 16C illustrates a top perspective view of the UAV of FIG. 16A.

As best seen in FIG. 16B, the spring-loaded release pins 1050A is released and has fallen below the fuselage 816 a distance such that the release pin tail retention end 1061A is out of the tail fin pockets 827 of tail fin 828 of tail fin sub-assembly 820B. However, the port (left) spring-loaded release pins 1050B still rides upon the top surface of the rotating (deploying) wing body 824 of the wing sub-assembly 818. As can be seen in this wing body configuration, the slope of the top surface changes. As, the spring-loaded release pins 1050A rides the changing slope, the release pin tail retention end 1061A also begins to move downward in a direction which would allow the release pin tail retention end 1061A to drop out of the tail fin pocket 827. Here, the tail fin sub-assembly 820B is becoming unlatched.

Hence, tail fin 828 of the tail fin sub-assembly 820B is released independent from the release of the tail fin 828 of tail fin sub-assembly 820A. By way of non-limiting example, the wing sub-assembly 818 is rotated approximately 59.5°. In other words, the lateral axis of the wing body 824 has approximately 59.5° offset (third angle) from the longitudinal axis of the fuselage 816 when the starboard tail fin sub-assembly 820B reaches the deployed configuration.

Figure 17C:
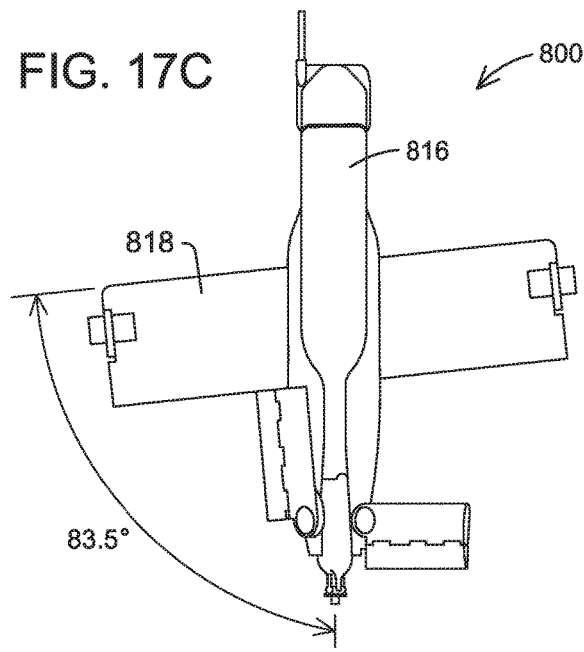
FIG. 17C illustrates a top perspective view of the UAV of FIG. 17A.

FIG. 17A illustrates a side view of the UAV 800 with the wing sub-assembly unfolded and the left hand tail fin sub-assembly 820B clear of obstruction of the wing body 824. FIG. 17B illustrates a cross sectional view along section A4-A4 of FIG. 17A. FIG. 17C illustrates a top perspective view of the UAV of FIG. 17A. Because the wing body of the wing sub-assembly 818 has cleared the spring-loaded release pins 1050A and 1050B, these spring-loaded release pins 1050A and 1050B have fallen or dropped downward. Therefore, the release pin tail retention ends 1061A and 1061B have correspondingly moved in a direction which moves the release pin tail retention ends 1061A and 1061B out of the pockets so that both tail fin sub-assemblies 820A and 820B are unlatched and released for deployment.

By way of non-limiting example, the wing sub-assembly 818 is rotated approximately 83.5°. In other words, the lateral axis of the wing body 824 has approximately 83.5° offset (fourth angle) from the longitudinal axis of the fuselage 816.

Figure 18C:
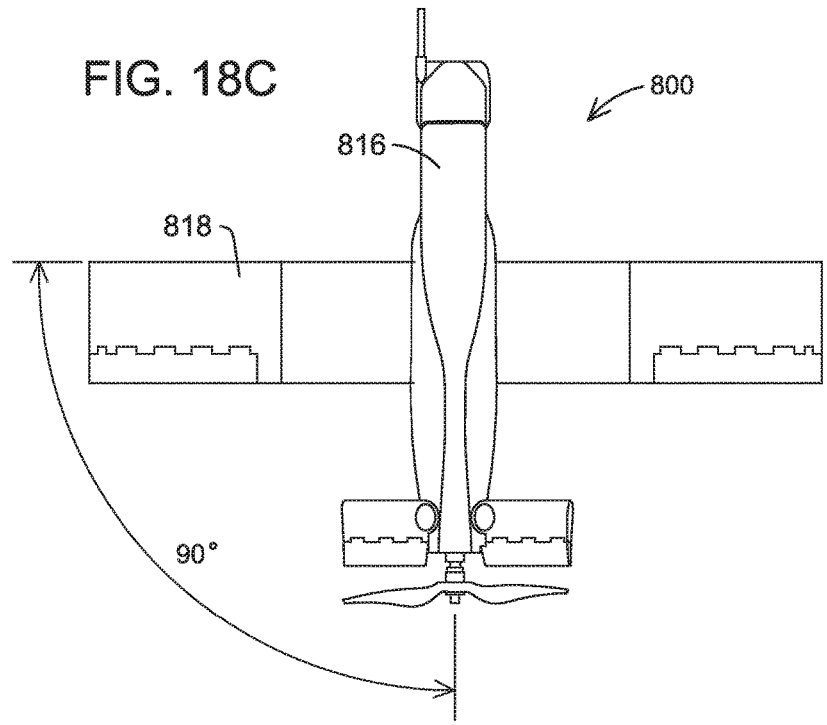
FIG. 18C illustrates a top perspective view of the UAV of FIG. 18A.

FIG. 18A illustrates a side view of the UAV 800 with the wing sub-assembly 818 unfolded and deployed and the pair of tail fin sub-assemblies in a deployed state. FIG. 18B illustrates a cross sectional view along section A5-A5 of FIG. 18A, and FIG. 18C illustrates a top perspective view of the UAV 800 of FIG. 18A.

The wing body 824 of the wing sub-assembly 818 has been fully deployed. Thus, the spring-loaded release pin 1050A and 1050B have fallen or dropped downward. Therefore, the release pin tail retention ends 1061A and 1061B have correspondingly moved in a direction which moves the release pin tail retention ends 1061A and 1061B out of the tail fin pockets 827 so that both tail fin sub-assemblies 820A and 820B are unlatched and released for deployment.

By way of non-limiting example, the wing sub-assembly 818 is rotated approximately 90°. In other words, the lateral axis of the wing body 824 has approximately 90° offset (fifth angle) from the longitudinal axis of the fuselage 816.

Independent tail release timing achieved mechanically by wing angle and proximity of pins riding the upper surface of a deploying wing.

Figure 19:
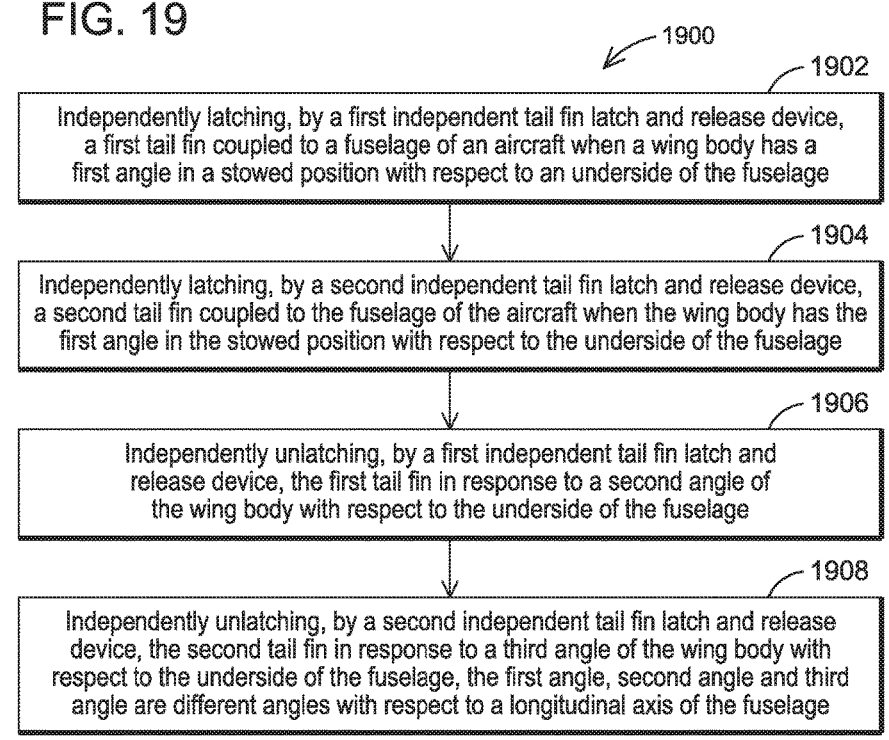
FIG. 19 is a flowchart of latching and unlatching of tail fins of an aircraft.

FIG. 19 is a flowchart of a method 1900 for latching and unlatching of tail fin sub-assemblies 820A, 820B of an aircraft. The method 1900 comprises, at block 1902, independently latching, by a first independent tail fin latch and release device, a first tail fin coupled to a fuselage of an aircraft when a wing body has a first angle in a stowed configuration with respect to an underside of the fuselage. The method, at block 1904, includes independently latching, by a second independent tail fin latch and release device, a second tail fin to the fuselage of the aircraft when the wing body has the first angle in the stowed configuration with respect to the underside of the fuselage. The method, at block 1906, includes independently unlatching, by a first independent tail fin latch and release device, the first tail fin in response to a second angle of the wing body with respect to the underside of the fuselage. The method, at block 1908, includes independently unlatching, by a second independent tail fin latch and release device, the second tail fin in response to a third angle of the wing body with respect to the underside of the fuselage, the first angle, second angle and third angle are different angles with respect to a longitudinal axis of the fuselage.

The embodiments herein eliminate the reliance on electrical power and critical computing resources needed elsewhere during the launch event. By leveraging existing structural surfaces and utilizing spring force to latch and unlatch the tail fins, timing is dependent solely upon the actual contact and motion state of the elements relative to one another.

Those skilled in the art will recognize improvements and modifications to the preferred embodiments of the disclosure. All such improvements and modifications are considered within the scope of the concepts disclosed herein and the claims that follow.

What is claimed is:

1. A system comprising:
    a pair of independent tail fin latch and release devices to independently latch a first tail fin and a second tail fin when a wing body is stowed at a first angle along an underside of a fuselage of a flight vehicle, each tail fin latch and release device comprises:
        a release pin column configured to be mounted in a shoulder of the fuselage, the release pin column including an elongated channel having an opposite end open through the fuselage;
        a spring biased release pin being spring biased in the elongated channel, the spring biased release pin comprising a collar, a first end configured to latch to a respective one tail fin in a latched state and a second end configured to ride along a top wing surface of the wing body during deployment of the wing body, the first end and second end being separated by the collar; and
        a spring positioned with the column and spiraled around the first end to bias the spring biased release pin in an unlatched state such that as the wing body clears the second end, the spring pushes the spring biased release pin through the underside of the fuselage to unlatch the respective one tail fin.

2. The system of claim 1, wherein each tail fin latch and release device further comprises a retention pin coupled to the release pin column to retain the spring biased release pin in the column.

3. The system of claim 1, wherein the pair of independent tail fin latch and release devices comprises a first tail fin latch and release device and a second tail fin latch and release device wherein the spring biased release pin of the first tail fin latch and release device is longer than the spring biased released pin of the second tail fin latch and release device.

4. The system of claim 3, further comprising:
    a first release pin catch pocket in the first tail fin configured to receive the first end of the spring biased release pin of the first tail fin latch and release device; and
    a second release pin catch pocket in the second tail fin configured to receive the first end of the spring biased release pin of the second tail fin latch and release device.

5. The system of claim 1, wherein the elongated channel has a first diameter; the collar has a second diameter; the first end having a third diameter; and the second end having a fourth diameter, wherein:
    the third diameter is less than the second diameter;
    the second diameter is less than the first diameter; and
    the fourth diameter less than the second diameter.

6. The system of claim 1, wherein the pair of independent tail fin latch and release devices comprises a first tail fin latch and release device and a second tail fin latch and release device wherein:

the first tail fin latch and release device independently unlatches the first tail fin in response to a second angle of deployment of the wing body with respect to the fuselage; and the second tail fin latch and release device independently unlatches the second tail fin in response to a third angle of deployment of the wing body with respect to the fuselage, the first angle, second angle, and third angle are different angles.

7. An aircraft comprising:

a fuselage having a first lateral side, a second lateral side, a top surface, an underside and a longitudinal axis;

a first tail fin rotatably mounted to the first lateral side;

a second tail fin rotatably mounted to the second lateral side;

a wing body rotatably mounted to the underside of the fuselage, the wing body comprising a top wing surface; and a pair of independent tail fin latch and release devices to independently latch the first tail fin and the second tail fin when the wing body having a first angle is in a stowed position with respect to the fuselage, to independently unlatch the first tail fin in response to a second angle of the wing body with respect to the fuselage, and to independently unlatch the second tail fin in response to a third angle of the wing body with respect to the fuselage, the first angle, second angle and third angle are different angles with respect to the longitudinal axis of the fuselage wherein each tail fin latch and release device comprises: a release pin column configured to be mounted to the fuselage, the release pin column including an elongated channel having an opposite end open through the fuselage from the top surface to the underside; a spring biased release pin being spring biased in the elongated channel, the spring biased release pin comprising a collar, a first end configured to latch to a respective one tail fin in a latched state and a second end configured to ride along the top wing surface of the wing body during deployment of the wing body, the first end and second end being separated by the collar; and a spring positioned with the column and spiraled around the first end to bias the spring biased release pin in an unlatched state such that as the wing body clears the second end, the spring pushes the spring biased release pin through the underside of the fuselage to unlatch the respective one tail fin.

8. The aircraft of claim 7, wherein each tail fin latch and release device further comprises a retention pin coupled to the release pin column to retain the spring biased release pin in the column.

9. The aircraft of claim 8, wherein the pair of independent tail fin latch and release devices comprises a first tail fin latch and release device and a second tail fin latch and release device wherein the spring biased release pin of the first tail fin latch and release device is longer than the spring biased released pin of the second tail fin latch and release device.

10. The aircraft of claim 9, further comprising:

a first release pin catch pocket in the first tail fin configured to receive the first end of the spring biased release pin of the first tail fin latch and release device; and a second release pin catch pocket in the second tail fin configured to receive the first end of the spring biased release pin of the second tail fin latch and release device.

11. The aircraft of claim 7, wherein the elongated channel has a first diameter; the collar has a second diameter; the first end having a third diameter; and the second end having a fourth diameter, wherein:

the third diameter is less than the second diameter;
the second diameter is less than the first diameter; and
the fourth diameter less than the second diameter.

12. The aircraft of claim 7, wherein the pair of independent tail fin latch and release devices comprises a first tail fin latch and release device and a second tail fin latch and release device wherein:

the first tail fin latch and release device independently unlatches the first tail fin in response to movement of the wing body to the second angle with respect to the fuselage; and the second tail fin latch and release device independently unlatches the second tail fin in response to movement of the wing body to the third angle with respect to the fuselage.

13. A method comprising:

independently latching, by a first independent tail fin latch and release device, a first tail fin coupled to a fuselage of an aircraft when a wing body has a first angle in a stowed position with respect to an underside of the fuselage;

independently latching, by a second independent tail fin latch and release device, a second tail fin to the fuselage of the aircraft when the wing body has the first angle in the stowed position with respect to the underside of the fuselage;

independently unlatching, by a first independent tail fin latch and release device, the first tail fin in response to a second angle of the wing body with respect to the underside of the fuselage; and independently unlatching, by a second independent tail fin latch and release device, the second tail fin in response to a third angle of the wing body with respect to the underside of the fuselage, the first angle, second angle and third angle are different angles with respect to a longitudinal axis of the fuselage wherein each tail fin latch and release device of the first tail fin latch and release device and the second tail fin latch and release device comprises: a release pin column configured to be mounted to the fuselage, the release pin column including an elongated channel having an opposite end open through the fuselage from a top surface of the fuselage to the underside of the fuselage; a spring biased release pin being spring biased in the elongated channel, the spring biased release pin comprising a collar, a first end configured to latch to a respective one tail fin in a latched state and a second end configured to ride along a top wing surface of the wing body during deployment of the wing body, the first end and second end being separated by the collar; and a spring positioned with the column and spiraled around the first end to bias the spring biased release pin in an unlatched state such that as the wing body clears the second end, the spring pushes the spring biased release pin through the underside of the fuselage to unlatch the respective one tail fin.

14. The method of claim 13, further comprises a retention pin coupled to the release pin column to retain the spring biased release pin in the column.

15. The method of claim 13, further comprising:

independently biasing the spring biased release pin of the first tail fin latch and release device in the unlatched state; and independently biasing the spring biased release pin of the second tail fin latch and release device in the unlatched state.

16. The method of claim 13, wherein the elongated channel has a first diameter; the collar has a second diameter; the first end having a third diameter; and the second end having a fourth diameter, wherein:
the third diameter is less than the second diameter;
the second diameter is less than the first diameter; and
the fourth diameter less than the second diameter.

17. The method of claim 13, wherein:
the first angle with respect to the longitudinal axis of the fuselage is approximately 0°
the second angle with respect to the longitudinal axis of the fuselage is less than 90°; and
the third angle with respect to the longitudinal axis of the fuselage is approximately 90°.

\* \* \* \* \*